(12) United States Patent
Shinagawa et al.

(10) Patent No.: US 7,263,295 B2
(45) Date of Patent: Aug. 28, 2007

(54) TRANSCEIVER SUITABLE FOR DATA COMMUNICATIONS BETWEEN WEARABLE COMPUTERS

(75) Inventors: Mitsuru Shinagawa, Kanagawa-ken (JP); Haruka Kyuragi, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 731 days.

(21) Appl. No.: 10/255,379

(22) Filed: Sep. 26, 2002

(65) Prior Publication Data

US 2003/0060162 A1 Mar. 27, 2003

(30) Foreign Application Priority Data

| Sep. 26, 2001 | (JP) | ............... 2001-295121 |
| Sep. 26, 2001 | (JP) | ............... 2001-295124 |
| Sep. 26, 2001 | (JP) | ............... 2001-295133 |
| Sep. 26, 2001 | (JP) | ............... 2001-295135 |
| Sep. 26, 2001 | (JP) | ............... 2001-295137 |
| Sep. 26, 2001 | (JP) | ............... 2001-295139 |

(51) Int. Cl.
*H04B 10/00* (2006.01)
(52) U.S. Cl. .................................................. 398/135
(58) Field of Classification Search ......... 398/135–201
See application file for complete search history.

(56) References Cited

U.S. PATENT DOCUMENTS

| 5,168,519 | A | * | 12/1992 | Scarinci et al. ............. 380/253 |
| 5,231,355 | A | * | 7/1993 | Rider et al. .................. 324/326 |
| 5,811,897 | A | * | 9/1998 | Spaude et al. ............... 307/149 |
| 6,211,799 | B1 | | 4/2001 | Post et al. |
| 6,223,018 | B1 | | 4/2001 | Fukumoto et al. |
| 6,975,813 | B1 | | 12/2005 | Inoue et al. |

FOREIGN PATENT DOCUMENTS

| EP | 0 682 262 A2 | 11/1995 |
| EP | 0 824 889 | 2/1998 |
| EP | 1 102 215 A2 | 5/2001 |
| JP | 60-250731 | 12/1985 |
| JP | 61-46639 | 3/1986 |
| JP | 02-227620 | 9/1990 |
| JP | 03-156378 | 7/1991 |
| JP | 05-126863 | 5/1993 |
| JP | 7-170215 | 7/1995 |

(Continued)

OTHER PUBLICATIONS

Zimmerman, T.G., "Personal Area Networks: Near Field intrabody communication", IBM System Journal, vol. 35, Nos. 3 & 4, 1996 pp. 609-617.

(Continued)

*Primary Examiner*—Jason Chan
*Assistant Examiner*—David Lee
(74) *Attorney, Agent, or Firm*—Kilpatrick Stockton LLP

(57) ABSTRACT

In a transceiver for inducing electric fields based on data to be transmitted in an electric field propagating medium and carrying out transmission and reception of data by using induced electric fields, having a transmission electrode and a transmission circuit, a transmission side switch is provided to disconnect the transmission circuit from the transmission electrode, when the transceiver is not in a transmission state in which the transmission circuit is supplying the transmission data to the transmission electrode.

6 Claims, 17 Drawing Sheets

FOREIGN PATENT DOCUMENTS

| | | |
|---|---|---|
| JP | 08-146051 | 6/1996 |
| JP | 11-142488 | 5/1999 |
| JP | 2001-298425 | 10/2001 |
| JP | 2001-352298 | 12/2001 |
| JP | 2001-352299 | 12/2001 |
| JP | 2002-152145 | 5/2002 |

OTHER PUBLICATIONS

Franjo Cecelja, Bala Balachandran, Michael Berwick, Manook Soghomonian, Srboljub Cvetkovic, "Optical sensors for the validation of electromagnetic field distributions in biological phantoms", SPIE, vol. 2510, Jun. 1995, pp. 244-254, XP002356925.

Nobuo Kuwabara and Ryuichi Kobayashi, "Frequency response improvement of electric field sensor using optical modulator", Instrumentation and Measurement Technology Conference, 1994, IMTC/94, Conference Proceedings, 10th Anniversary, Advanced Technologies in I & M, 1994, IEEE Hamamatsu, Japan May 10-12, 1994, New York, NY USA, IEEE, May 10, 1994, pp. 21-24, XP010122050, ISBN: 0-7803-1880-3.

* cited by examiner ic fields.
TRANSCEIVER SUITABLE FOR DATA COMMUNICATIONS BETWEEN WEARABLE COMPUTERS

BACKGROUND OF THE INVENTION

1. Field of the Invention

The present invention relates to a transceiver to be used for data communications between wearable computers (computers to be worn) for example, and more particularly to a transceiver for inducing electric fields based on data to be transmitted in an electric field propagating medium and carrying out transmission and reception of data by using the induced electric fields.

The present invention also relates to an electric field detecting optical device for detecting electric fields based on transmission data which are induced in and propagated through an electric field propagating medium such as a living body and converting them into electric signals in such a transceiver.

The present invention also relates to a photodetection circuit for detecting lights with optical characteristics changed by the detected electric fields and converting them into electric signals in such an electric field detecting optical device.

2. Description of the Related Art

Due to the progress in reducing size and improving performance of portable terminals, the wearable computers are attracting attentions. FIG. 1 shows an exemplary case of using such wearable computers by wearing them on a human body. As shown in FIG. 1, the wearable computers 1 are put on arms, shoulders, torso, etc., of the human body through respective transceivers 3 and capable of carrying out mutual data transmission and reception as well as communications with an externally provided PC 5 via a cable through transceivers 3a and 3b attached at tip ends of a hand and a leg.

The transceiver 3 to be used for data communications between the wearable computers 1 in such a way is utilizing the signal detection technique based on the electro-optic method using laser lights and electro-optic crystals, in which electric fields based on data to be transmitted are induced in a living body which is an electric field propagating medium and data transmission and reception are carried out by using the induced electric fields.

FIG. 2 shows an exemplary configuration of the transceiver 3, which has an I/O (Input/Output) circuit 101 through which the transceiver 3 is connected to the wearable computer 1, and a transmission electrode 105 and a reception electrode 107 provided in a vicinity of the living body 100 through insulation films 106 and 108 respectively. In this transceiver 3, the electric fields based on the transmission data are induced in the living body 100 from the transmission electrode 105 through the insulation film 106, and the electric fields induced at the other portion of the living body 100 and propagated through the living body 100 are received at the reception electrode 107 through the insulation film 108.

More specifically, in this transceiver 3, when the transmission data from the wearable computer 1 are received through the I/O circuit 101, these transmission data are supplied to a transmission circuit 103 after adjusting their level at a level adjustment circuit 102. The transmission circuit 103 supplies the level adjusted transmission data to the transmission electrode 105, and the electric fields based on the transmission data are induced in the living body 100 from the transmission electrode 105 through the insulation film 100, such that the induced electric fields are propagated to the transceiver 3 provided at the other portion of the living body 100.

On the other hand, when the electric fields induced at the other portion of the living body 100 and propagated through the living body 100 are received at the reception electrode 107 provided in a vicinity of the living body 100 through the insulation film 108, the received electric fields are coupled to an electric field detecting optical unit 110, converted into electric signals by the electro-optic method using laser light and electro-optic element at the electric field detecting optical unit 110, and supplied to a signal processing circuit 109.

In further detail, as shown in FIG. 3, the electric fields are coupled to an electro-optic crystal 131 onto which the laser light from a laser light source 133 is injected, so as to change the polarization state of the laser light. The changes of the polarization state of the laser light are then detected and converted into electric signals by a polarization detecting optical system 135, and supplied to the signal processing circuit 109. Here, the laser light source 133 is operated by currents supplied from a current source 137.

The signal processing circuit 109 applies signal processings such as low noise amplification, noise removal, waveform shaping, etc., with respect to the electric signals from the electric field detecting optical unit 110 or the polarization detecting optical system 135, and supplies them to the wearable computer 1 through the I/O circuit 101.

In the above described conventional transceiver, the transmission circuit 103 and the level adjustment circuit 102 are always connected to the transmission electrode 105, so that while the reception electrode 107 are in a process of receiving the electric fields based on the transmission data from the other portion of the living body 100, the noises from a power source or the like are supplied to the transmission electrode 105 from the transmission circuit 103 and the level adjustment circuit 102, and the electric fields due to these noises are induced in the living body 100 from the transmission electrode 105 and propagated not only to the same transceiver 3 but also to the reception electrode 107 of the other transceiver 3 as well, and this can be a cause of the operation error.

Also, in the above described conventional transceiver, after the level adjustment of the transmission data received from the wearable computer 1, the electric fields are induced in the living body 100 from the transmission circuit 103 through the transmission electrode 105 and the insulation film 106 and propagated through the living body 100, and these electric fields are received through the insulation film 108 and the reception electrode 107 at the other portion of the living body 100. However, the electric fields induced in and propagated through the living body 100 in this manner have weak levels, so that they have a poor S/N ratio, a high probability for causing the operation error, and a poor reliability.

Also, the above described transceiver requires the power consumption to be as small as possible because it is to be used by being put on the living body 100 along with the wearable computer 1. On the other hand, there is no need for the laser light source 133 to be operated all the times. For example, there is no need to operate the laser light source 133 at a time of transmission at which the electric fields are not to be received. However, in the above described conventional transceiver, the laser light source 133 is always operated to generate the laser light so that it is always possible to detect the electric fields induced in and propagated through the living body 100. Consequently, there has been wasteful power consumption as the laser light source 133 is operated even in a state here there is no need to operate the laser light source 133 such as the transmission state in particular.

Also, for the sake of the practical realization of such a wearable computer, the scheme for data communications between the wearable computers is very important, and the conventionally available scheme for data communications between the wearable computers include a scheme for carrying out wired communications by connecting the transceivers connected to the wearable computers by a data line and a ground line, a scheme for carrying out radio communications by connecting the transceivers by radio, and a scheme for carrying out data transmission and reception by using the living body as a signal line and the Earth ground with which the living body is in contact as a ground line (see PAN: Personal Area Network, IBM SYSTEMS JOURNAL, Vol. 35, Nos. 3 & 4, pp. 609–617, 1996).

However, the wired communication scheme requires to connect the transceivers by two cable lines, and in the case of carrying out data transmission and reception between distant wearable computers or among a plurality of wearable computers, it becomes necessary to arrange many cable lines all over the body so that it is not practical.

Also, the radio communication scheme has a possibility of crosstalking with the other systems existing nearby depending on the radio frequencies and powers.

Also, the wearable computers are expected to be mostly put on the upper half body in general, but the communication scheme utilizing the living body as a signal path has a practical problem in this regard in that the communications become impossible when the transceiver of the wearable computer is arranged far from the Earth ground such as at the head for example.

FIG. 4 shows another exemplary configuration of the transceiver 3, which has the I/O circuit 101 through which the transceiver 3 is connected to the wearable computer 1, and the transmission electrode 105 and the reception electrode 107 provided in a vicinity of the living body 100 through the insulation films 106 and 108 respectively, similarly as in the transceiver of FIGS. 2 and 3.

More specifically, in this transceiver 3, when the transmission data from the wearable computer 1 are received through the I/O circuit 101, these transmission data are supplied to a transmission circuit 103 after adjusting their level at a level adjustment circuit 102. The transmission circuit 103 supplies the level adjusted transmission data to the transmission electrode 105, and the electric fields based on the transmission data are induced in the living body 100 from the transmission electrode 105 through the insulation film 100, such that the induced electric fields are propagated to the transceiver 3 provided at the other portion of the living body 100.

On the other hand, when the electric fields induced at the other portion of the living body 100 and propagated through the living body 100 are received at the reception electrode 107 provided in a vicinity of the living body 100 through the insulation film 108, the received electric fields are coupled to an electric field detecting optical unit 110, converted into intensity changes of lights composed of P-polarization components and S-polarization components by the electro-optic method using laser light and electro-optic element at the electric field detecting optical unit 110, and supplied to a photodetection circuit 120.

The photodetection circuit 120 converts the light signals composed of P-polarization components and the S-polarization components from the electric field detecting optical unit 110 into electric signals. These electric signals are then subjected to a noise removal by a band-pass filter 132 and a waveform shaping by a waveform shaping circuit 134, and supplied as received data to the wearable computer 1 through the I/O circuit 101.

The photodetection circuit 120 is formed by a circuit called a balanced detection and single amplification type circuit as shown in FIG. 5, in which a midpoint of first and second photodiodes 91 and 93 that are connected in series between bias voltage sources (+V, −V) is grounded through a load resistor 95 as well as connected to an input of an amplifier 97.

The first and second photodiodes 91 and 93 constituting this conventional photodetection circuit 120 are playing the role of a differential amplifier, and when the light signals with intensity changes in opposite phases composed of P-polarization components and the S-polarization components from the electric field detecting optical unit 110 are detected, the first and second photodiodes 91 and 93 produce currents generated in response to respective light signals such that they are added together at the load resistor 95 to double the currents, and a voltage corresponding to these doubled currents is generated at both ends of the load resistor 95 and supplied as an input voltage to the amplifier 97.

Now, the laser lights generated at the electric field detecting optical unit 110 utilizing the electro-optic method contain noises generated from the laser diode itself or the power source in general. The light signals injected into the first and second photodiodes 91 and 93 of the photodetection circuit 120 from the electric field detecting optical unit 110 that uses such noise mixed laser lights will also contain noises, so that there is a need to remove these noises. In the photodetection circuit of FIG. 5, such noises mixed in the laser lights have the same phase and same level so that they are removed by the balanced detection made by the first and second photodiodes 91 and 93 and the load resistor 95, and they will not be entered into the amplifier 97.

However, the noises mixed at the photodetection circuit as shown in FIG. 5 include not only the noises mixed in the laser lights but also noises mixed into output current signals of the photodiodes via a metallic casing that covers outer sides of the photodiodes 91 and 93, for example. Such noises do not necessarily have the same phase and same level unlike the noises mixed in the laser lights, and the noise levels may vary depending on the positional relationship between the noise source and the photodiodes 91 and 93 or on the way in which the noises are mixed, so that they cannot be removed by the conventional photodetection circuit such as that shown in FIG. 5.

BRIEF SUMMARY OF THE INVENTION

It is therefore an object of the present invention to provide a transceiver for enabling bidirectional communications by preventing propagation of noises from internal circuits to the transmission electrode, by separating the transmission electrode from the internal circuits while not in the transmission state.

It is another object of the present invention to provide a transceiver in which the S/N ratio is improved by modulating the electric fields induced in and propagated through the electric field propagating medium by utilizing the resonant frequency due to the inverse piezo-electric effect of the electro-optic element.

It is another object of the present invention to provide a transceiver capable of reducing the power consumption by controlling the operation of the light source according to the operation state of the transceiver.

It is another object of the present invention to provide an electric field detecting optical device to be used for carrying out the data communications using electric fields properly, which is suitable for use in the transceiver for the wearable computer, which does not require any cable lines, which is not radio, and which basically does not depend on the Earth ground.

It is another object of the present invention to provide a photodetection circuit capable of properly removing not only the noises mixed in the laser lights but also the other noises that are mixed at different levels.

According to one aspect of the present invention there is provided a transceiver for inducing electric fields based on data to be transmitted in an electric field propagating medium and carrying out transmission and reception of data by using induced electric fields, comprising: a transmission electrode configured to induce the electric fields based on the data to be transmitted in the electric field propagating medium; a transmission circuit configured to supply transmission data for causing the transmission electrode to induce the electric fields based on the data to be transmitted in the electric field propagating medium, to the transmission electrode; and a transmission side switch configured to disconnect the transmission circuit from the transmission electrode, when the transceiver is not in a transmission state in which the transmission circuit is supplying the transmission data to the transmission electrode.

According to another aspect of the present invention there is provided a transceiver for inducing electric fields based on data to be transmitted in an electric field propagating medium and carrying out transmission and reception of data by using induced electric fields, comprising: a transmission electrode configured to induce the electric fields based on the data to be transmitted in the electric field propagating medium; a transmission circuit configured to supply transmission data for causing the transmission electrode to induce the electric fields based on the data to be transmitted in the electric field propagating medium, to the transmission electrode; a reception electrode configured to receive electric fields induced in and propagated through the electric field propagating medium; an electric field detection unit configured to detect received electric fields as received by the reception electrode, and convert the received electric fields into electric signals by causing a resonance in an electro-optic element by using the received electric fields; a modulation circuit configured to modulate the transmission data by using resonant frequencies of the electro-optic element as modulation frequencies, and supply modulated transmission data to the transmission circuit; and a demodulation circuit configured to demodulate the electric signals from the electric field detection unit.

According to another aspect of the present invention there is provided a transceiver for inducing electric fields based on data to be transmitted in an electric field propagating medium and carrying out transmission and reception of data by using induced electric fields, comprising: a light source configured to generate lights; an electric field detection unit configured to detect electric fields induced in and propagated through the electric field propagating medium by using lights from the light source, convert the electric fields into electric signals, and output the electric signals; and a control unit configured to control an operation of the light source according to an operation state of the transceiver.

Other features and advantages of the present invention will become apparent from the following description taken in conjunction with the accompanying drawings.

DETAILED DESCRIPTION OF THE INVENTION

Figure 6:
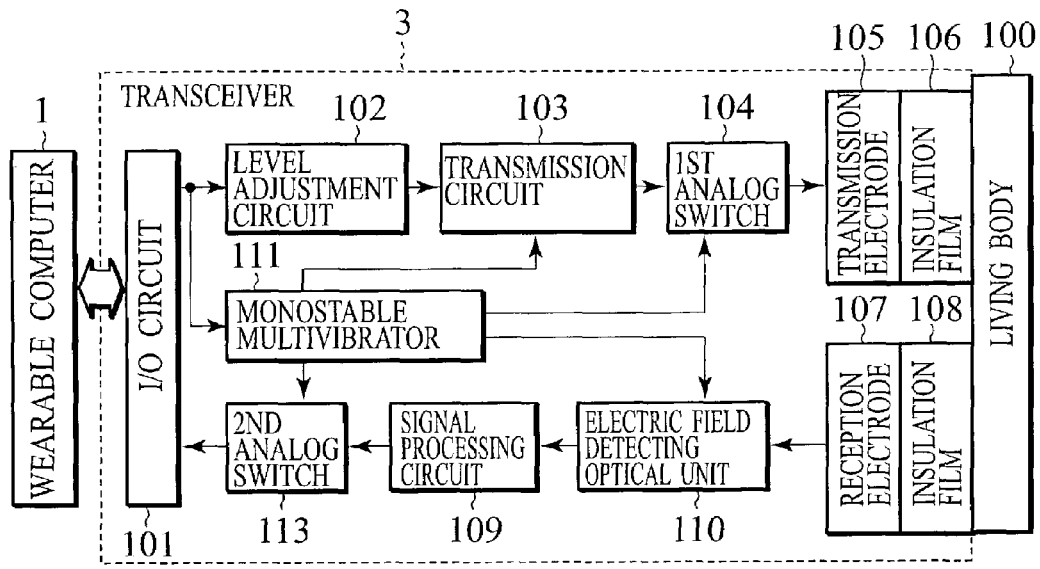
FIG. 6 is a block diagram showing one exemplary configuration of a transceiver according to the first embodiment of the present invention.
Figure 7:
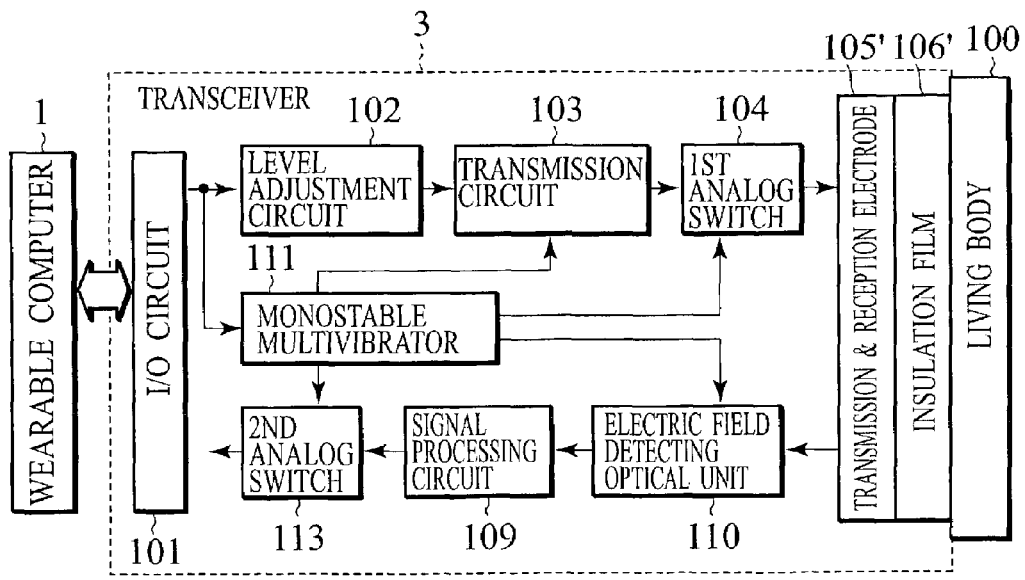
FIG. 7 is a block diagram showing another exemplary configuration of a transceiver according to the first embodiment of the present invention.

Referring now to FIG. 6 and FIG. 7, the first embodiment of a transceiver according to the present invention will be described in detail.

Figure 1:
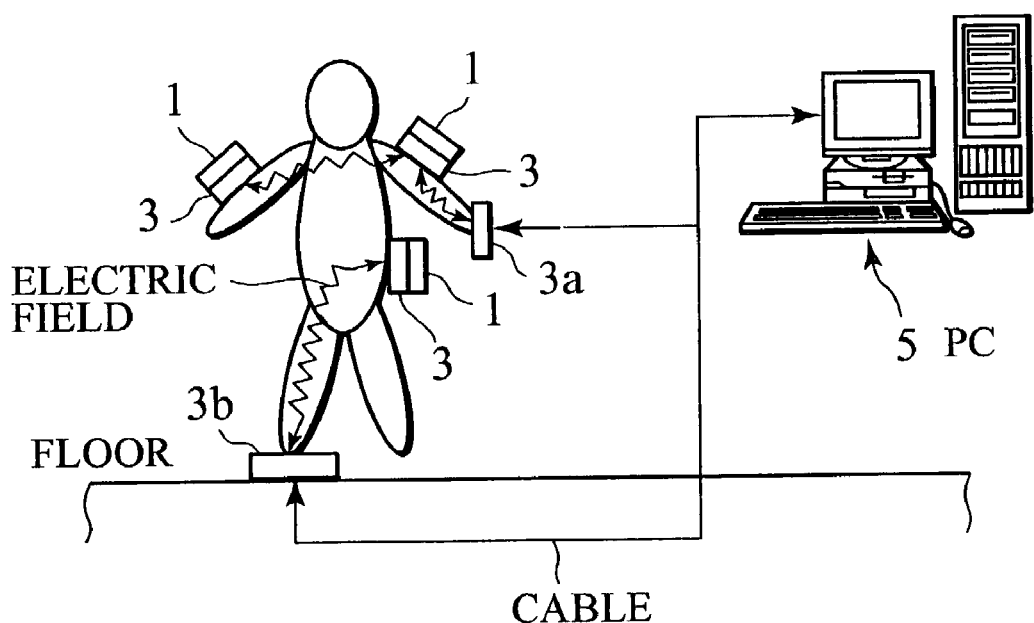
FIG. 1 is a diagram showing an exemplary case of using wearable computers by putting them on a human body through transceivers.
Figure 2:
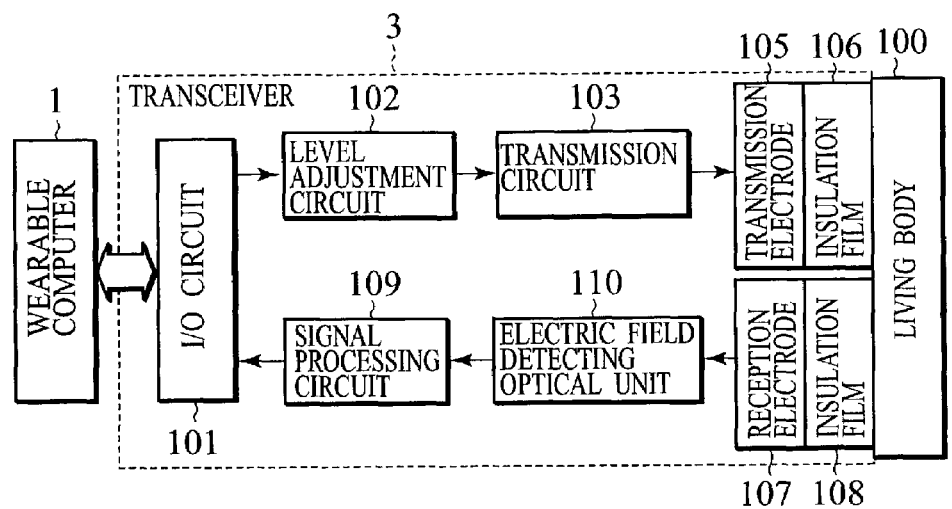
FIG. 2 is a block diagram showing one exemplary configuration of a conventional transceiver for a wearable computer.

FIG. 6 shows a circuit configuration of a transceiver according to the first embodiment of the present invention. The transceiver of FIG. 6 differs from the conventional transceiver of FIG. 2 in that a first analog switch 104 is provided between the transmission circuit 103 and the transmission electrode 105, a second analog switch 113 is provided between the signal processing circuit 109 and the I/O circuit 101, and a monostable multivibrator 111, which is a monostable circuit that functions as a signal output unit that is operated by being triggered by the transmission data outputted from the I/O circuit 101, is provided such that its output signal controls the first analog switch 104, the second analog switch 113, the transmission circuit 103 and the electric field detecting optical unit 110. The rest of the configuration and the operation of the transceiver of FIG. 6 are the same as those of FIG. 2, and the same reference numerals are given to the corresponding elements.

Note that the configuration of FIG. 6 can be modified to that shown in FIG. 7, where the transmission electrode 105 and the reception electrode 107 of FIG. 6 are integrally provided as a transmission and reception electrode 105' in FIG. 7, and the insulation films 106 and 108 of FIG. 6 are integrally provided as an insulation film 106' in FIG. 7.

The monostable multivibrator 111 is triggered by detecting a start of data packets that are the transmission data supplied from the wearable computer 1 through the I/O circuit 101, and generates a first output signal of a first level (high level, for example) for a prescribed period of time since the start time of the data packets, such as a prescribed period of time corresponding to the duration of the data packets during which the data packets are outputted, or generates a second output signal of a second level (low level, for example) for remaining periods of time, i.e., periods at which the data packets are not outputted. The monostable multivibrator 111 supplies these first and second output signals to the first analog switch 104, the second analog switch 113, the transmission unit 103 and the electric field detecting optical unit 110. Namely, the first output signal to be outputted for a prescribed period of time from the monostable multivibrator 111 indicates that the transceiver 3 is in the transmission state, and the second output signal from the monostable multivibrator 111 indicates that the transceiver 3 is not in the transmission state but in a state capable of receiving data from the other transceivers 3.

When the first output signal from the monostable multivibrator 111 is supplied, the first analog switch 104 is turned ON, such that the transmission electrode 105 and the transmission circuit 103 are connected, the data packets constituting the transmission data supplied through the transmission circuit 103 are supplied to the transmission electrode 105, and the electric fields based on the transmission data are induced in the living body 100 through the transmission electrode 105 and propagated to the other transceiver 3 provided at the other portion of the living body 100.

Also, when the second output signal from the monostable multivibrator 111 is supplied, the first analog switch 104 is turned OFF, such that the transmission electrode 105 and the transmission circuit 103 are separated, i.e., the signal path between the transmission electrode 105 and the transmission circuit 103 is disconnected, and the noises from the power source or the like will not be supplied to the transmission electrode 105 through the transmission circuit 103 and the level adjustment circuit 102. As a result, the first analog switch 104 is turned OFF while the transceiver 3 is in a state of not outputting the transmission data so that the electric fields due to the noises will not be induced in the living body 100 and therefore it is possible to prevent the reception electrode 107 to cause the operation error by receiving the noise electric fields.

On the other hand, when the first output signal from the monostable multivibrator 111 is supplied, the second analog switch 113 is turned OFF, such that the signal processing circuit 109 and the I/O circuit 101 are separated, i.e., the signal path between the signal processing circuit 109 and the I/O circuit 101 is disconnected, and the noises due to the noise electric fields received by the reception electrode 107 will not be supplied to the I/O circuit 101 through the electric field detecting optical unit 110 and the signal processing circuit 109 to cause the operation error.

Note that, in this embodiment, the second analog switch 113 is connected between the signal processing circuit 109 and the I/O circuit 101 so as to disconnect the signal path between them, but it is not necessarily limited to this case, and it is also possible to provide the second analog switch 113 between the electric field detecting optical unit 110 and the signal processing circuit 109 so as to disconnect the signal path between them. In essence, it suffices to disconnect the propagation path of the received signals on the circuit section subsequent to the electric field detecting optical unit 110.

Also, when the second output signal from the monostable multivibrator 111 is supplied, the second analog switch 113 is turned ON, such that the signal processing circuit 109 and the I/O circuit 101 are connected, and the signals due to the electric fields received by the reception electrode 107 will be supplied to the I/O circuit 101 through the electric field detecting optical unit 110 and the signal processing circuit 109.

As already mentioned above, the electric field detecting optical unit 110 utilizes the signal detection technique based on the electro-optic method using laser lights and the electro-optic crystals, and internally has a laser diode (not shown). In this embodiment, when the transceiver 3 is not in the reception state, there is no need to operate the electric field detecting optical unit 110 and therefore there is no need to operate the laser diode, so that the laser diode provided inside the electric field detecting optical unit 110 is controlled to be operated only during the reception state and not operated during the transmission state according to the output signals from the monostable multivibrator 111, so as to reduce the power consumption.

Namely, when the first output signal from the monostable multivibrator 111 is supplied, the electric field detecting optical unit 110 turns the laser diode OFF, and when the second output signal from the monostable multivibrator 111 is supplied, the electric field detecting optical unit 110 turns the laser diode ON.

Note that, in the above description, only the laser diode is turned ON/OFF, but it is also possible to apply this ON/OFF control to the entire electric field detecting optical unit 110 including the laser diode. Namely, it is also possible to control such that, when the first output signal from the monostable multivibrator 111 is supplied, the entire electric field detecting optical unit 110 is turned OFF, and when the second output signal from the monostable multivibrator 111 is supplied, the entire electric field detecting optical unit 110 is turned ON. In this case, it is possible to reduce the power consumption further.

The first and second output signals from the monostable multivibrator 111 are also supplied to the transmission circuit 103, and the transmission circuit 103 has a built-in switch that is turned ON/OFF by the first and second output signals from the monostable multivibrator 111 such that, when the first output signal from the monostable multivibrator 111 is supplied, this switch is turned ON and the power to operate the transmission circuit 103 is supplied, and when the second output signal from the monostable multivibrator 111 is supplied, this switch is turned OFF and the power supply is stopped so that the operation of the transmission circuit 103 is stopped, for example. As a result, it is possible to reduce the power consumption by the transmission circuit 103 while the transceiver is in a state other than the transmission state, i.e., the reception state or the reception waiting state.

Note that, in the above description, the first analog switch 104 is turned ON to connect the transmission circuit 103 to the transmission electrode 105 by the first output signal from the monostable multivibrator 111 which is outputted for a prescribed period of time since the start time of the data packets, and turned OFF to separate the transmission circuit 103 from the transmission electrode 105 during the other periods at which the second output signal is outputted from the monostable multivibrator 111. In this regard, in essence, it suffices to turn the first analog switch 104 ON to connected the transmission circuit 103 to the transmission electrode 105 only while the transceiver 3 is in the transmission state, and to turn the first analog switch 104 OFF to separate the transmission circuit 103 from the transmission electrode 105 while the transceiver 3 is not in the transmission state such that the noises from the level adjustment circuit 102 and the transmission circuit 103 will not induce the noise electric fields in the living body 100.

Similarly, in the above description, the second analog switch 113 is turned OFF to separate the signal processing circuit 109 from the I/O circuit 101 when the first output signal from the monostable multivibrator 111 is supplied, and turned ON to connect the signal processing circuit 109 to the I/O circuit 101 during the other periods at which the second output signal is outputted from the monostable multivibrator 111. In this regard, in essence, it suffices to turn the second analog switch OFF to separate the signal processing circuit 109 from the I/O circuit 101 only while the transceiver 3 is in the transmission state, and to turn the second analog switch 113 ON to connect the signal processing circuit 109 to the I/O circuit 101 while the transceiver 3 is not in the transmission state such that the data due to the electric fields received by the reception electrode 107 can be propagated to the I/O circuit 101.

As described, according to the first embodiment, the transmission circuit is separated from the transmission electrode by the first analog switch when the transceiver is not in the transmission state, so that it is possible to prevent the noises of the power source or the like from the transmission circuit to induce the noise electric fields in the electric field propagating medium and being propagated to the receiving side in the reception state or the reception waiting state, and therefore it becomes possible to carry out the bidirectional communication operation properly without the operation error.

Also, according to the first embodiment, the electric field detecting optical unit is separated from the signal processing circuit or the signal processing circuit is separated from the circuit subsequent to the signal processing circuit by the second analog switch when the transceiver is in the transmission state, so that it is possible to prevent the transmission data to be propagated to the receiving side of the same transceiver, and therefore it becomes possible to carry out the bidirectional communication operation properly.

Also, according to the first embodiment, the transmission is made possible by turning the transmission path ON for a prescribed period of time since the start of the data packets, and the transmission path is turned OFF for the other periods, so that it is possible to identify the transmission state accurately and easily according to the data packets, and the signal path of the transmission circuit is turned OFF in the reception state or the reception waiting state, so that it is possible to prevent the noises of the power source or the like to induce the noise electric fields in the electric field propagating medium and being propagated to the receiving side, and therefore it becomes possible to carry out the bidirectional communication operation properly without the operation error.

Also, according to the first embodiment, the transmission circuit is operated by supplying the power while the first output signal is outputted from the monostable multivibrator, and the operation of the transmission circuit is stopped by stopping the power supply while the second output signal is outputted from the monostable multivibrator, so that it is possible to prevent the noises of the power source or the like from the transmission circuit to induce the noise electric fields in the electric field propagating medium and being propagated to the receiving side in the reception state or the reception waiting state, and therefore it becomes possible to carry out the proper operation, and it becomes possible to reduce the power consumption by the transmission circuit in the reception state or the reception waiting state.

Also, according to the first embodiment, the operation of the electric field detecting optical unit is stopped by stopping the power supply while the first output signal is outputted from the monostable multivibrator, and the electric field detecting optical unit is operated by supplying the power while the second output signal is outputted from the monostable multivibrator, so that it is possible to prevent the transmission data to be propagated to the receiving side of the same transceiver, and therefore it becomes possible to carry out the proper operation, and it becomes possible to reduce the power consumption by the electric field detecting optical unit in the transmission state.

Figure 8:
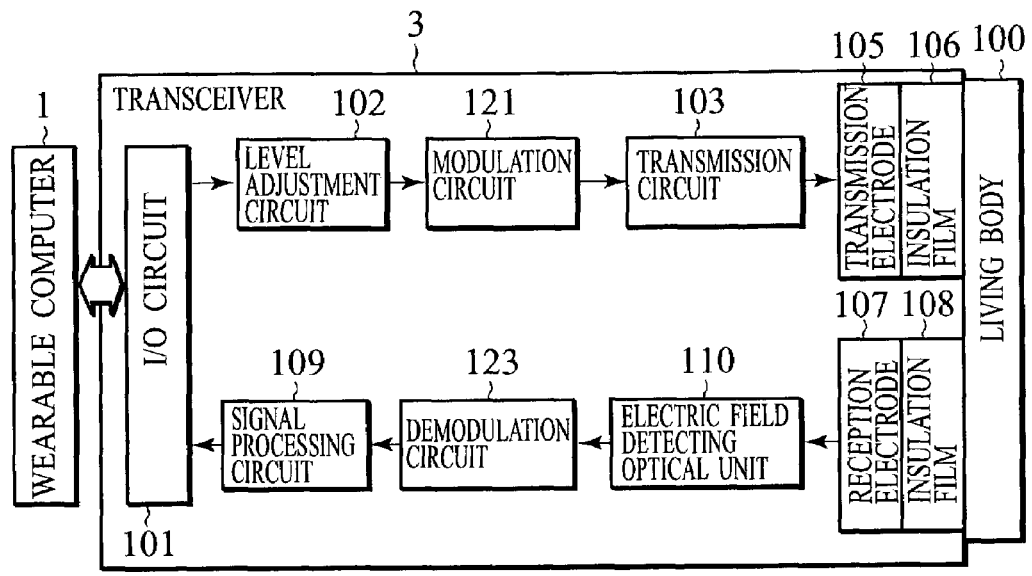
FIG. 8 is a block diagram showing one exemplary configuration of a transceiver according to the second embodiment of the present invention.
Figure 9:
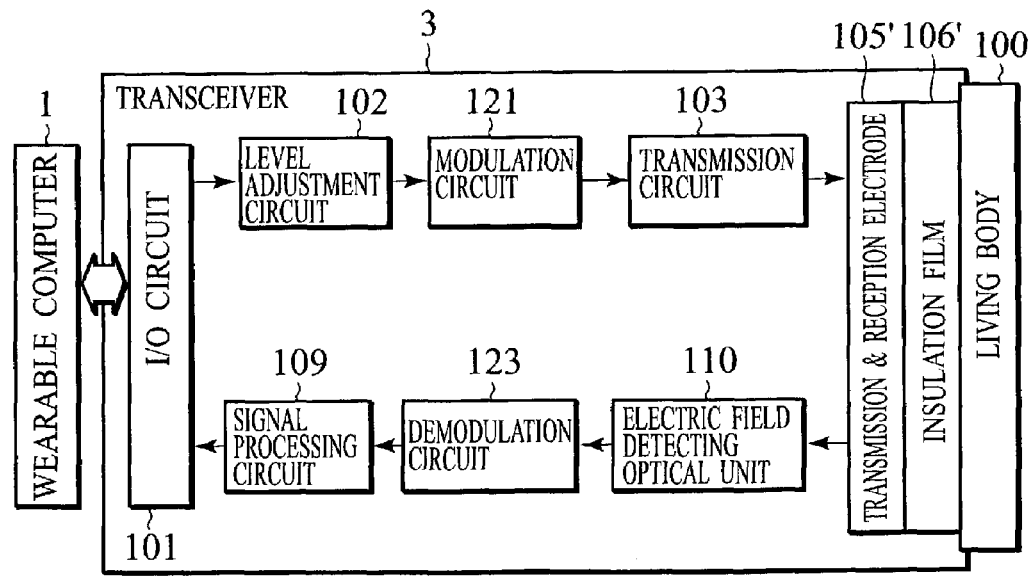
FIG. 9 is a block diagram showing another exemplary configuration of a-transceiver according to the second embodiment of the present invention.

Referring now to FIG. 8 and FIG. 9, the second embodiment of a transceiver according to the present invention will be described in detail.

FIG. 8 shows a circuit configuration of a transceiver according to the second embodiment of the present invention. The transceiver of FIG. 8 differs from the conventional transceiver of FIG. 2 in that a modulation circuit 121 is provided between the level adjustment circuit 102 and the transmission circuit 103, and a demodulation circuit 123 is provided between the electric field detecting optical unit 110 and the signal processing circuit 109. The rest of the configuration and the operation of the transceiver of FIG. 8 are the same as those of FIG. 2, and the same reference numerals are given to the corresponding elements.

Note that the configuration of FIG. 8 can be modified to that shown in FIG. 9, where the transmission electrode 105 and the reception electrode 107 of FIG. 8 are integrally provided as a transmission and reception electrode 105' in FIG. 9, and the insulation films 106 and 108 of FIG. 8 are integrally provided as an insulation film 106' in FIG. 9.

In the transceiver 3 of FIG. 8, the electro-optic element utilized for the electro-optic method of the electric field detecting optical unit 110 has the electro-optic characteristic such that, when it is coupled with the electric field, its birefringence changes due to the Pockels effect which is the primary electro-optic effect, and when the laser light is injected in this state, it changes the polarization state of the laser light. In addition, the electro-optic element also exhibits the phenomenon called inverse piezo-electric effect such that when it is coupled with the electric field, its crystal is physically distorted. The polarization of the laser light is also changed by this distortion due to the inverse piezo-electric effect (the photoelasticity effect).

Also, when the electric field to be coupled to the electro-optic element is changed at some frequency, the physical distortion of the electro-optic element also changed at that frequency, and when this change resonates with a distance between opposite faces of the electro-optic element, the polarization change of the laser light becomes extremely large.

The transceiver 3 of FIG. 8 utilizes a resonant frequency that causes this resonance effect for the purpose of the modulation of the transmission data, so as to improve the S/N ratio. Note that the electro-optic element has a plurality of resonant frequencies, so that for the purpose of the modulation, arbitrary two resonant frequencies corresponding to the high level and the low level of the transmission data are utilized as the digital modulation frequencies, and these two digital modulation frequencies are supplied to the modulation circuit 121 and the demodulation circuit 123.

The modulation circuit 121 modulates the transmission data from the level adjustment circuit 102 by using these two digital modulation frequencies and supplies the modulated transmission data to the transmission circuit 103. The transmission circuit 103 supplies the modulated transmission data from the modulation circuit 121 to the transmission electrode 105. The transmission electrode 105 induces the electric fields corresponding to the modulated transmission data in the living body 100 through the insulation film 106.

The electric fields induced in the living body 100 in this manner are then propagated to the transceiver 3 provided at the other portion of the living body 100. At this transceiver 3, the reception electrode 107 receives the electric fields through the insulation film 108 and couples them to the electric field detecting optical unit 110.

In the electric field detecting optical unit 110, the electro-optic element is resonated by the coupled electric fields to increase the polarization changes of the laser light, and the electric signals modulated at the two digital modulation frequencies are supplied to the demodulation circuit 123.

The demodulation circuit 123 demodulates the electric signals supplied from the electric field detecting optical unit 110 by using the two digital modulation frequencies, and supplies them to the signal processing circuit 109. The signal processing circuit 109 applies signal processings such as low noise amplification, noise removal, waveform shaping, etc., with respect to the demodulated electric signals from the demodulation circuit 123, and supplies them to the wearable computer 1 through the I/O circuit 101.

As described, according to the second embodiment, the transmission data are modulated by the resonant frequencies of the electro-optic element, and the modulated transmission data are propagated by inducing the electric fields in the electric field propagating medium from the transmission electrode. Then, the propagated electric fields are received by the reception electrode, the electro-optic element of the electric field detecting optical unit is resonated to convert them into electric signals, and these electric signals are demodulated. Consequently, the polarization changes become extremely large due to the resonance of the electro-optic element, and the transmission and reception are carried out by using the modulated electric signals, so that the S/N ratio can be improved, the operation error can be eliminated, and the reliability can be improved.

Also, according to the second embodiment, the transmission data are modulated by using arbitrary two resonant frequencies as digital modulation frequencies corresponding to the high level and the low level of the transmission data, so that the S/N radio can be improved, the operation error can be eliminated, and the reliability can be improved.

Referring now to FIG. 10 to FIG. 14, the third embodiment of a transceiver according to the present invention will be described in detail.

Figure 3:
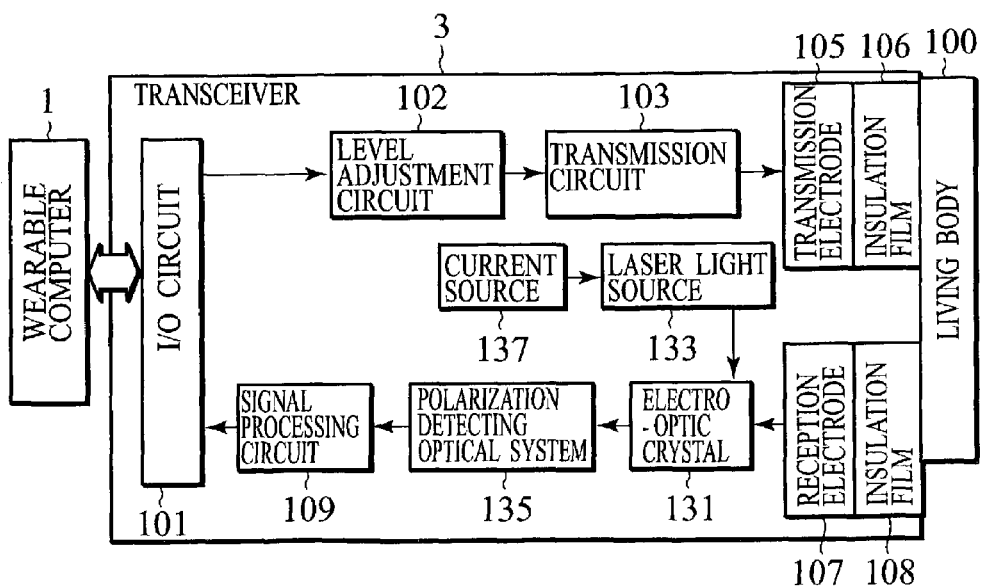
FIG. 3 is a block diagram showing another exemplary configuration of a conventional transceiver for a wearable computer.
Figure 4:
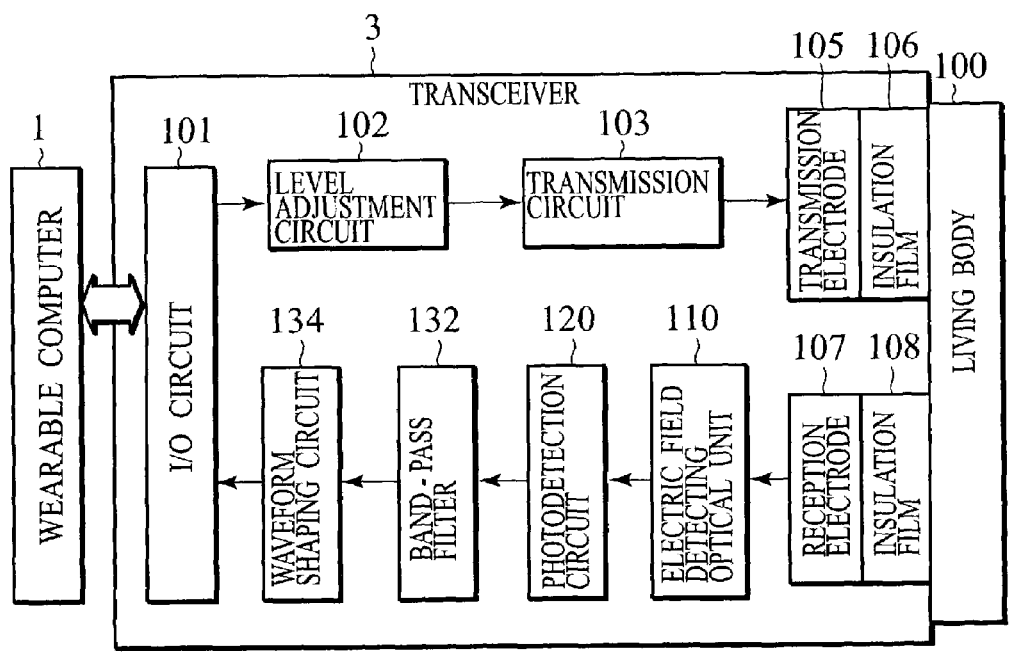
FIG. 4 is a block diagram showing another exemplary configuration of a conventional transceiver for a wearable computer.
Figure 5:
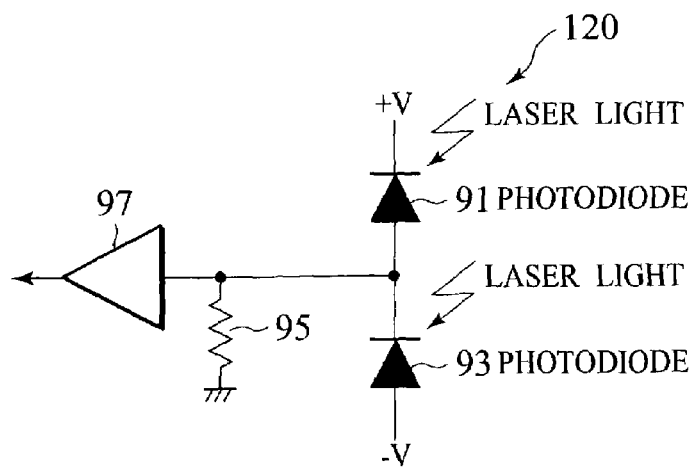
FIG. 5 is a circuit diagram showing an exemplary configuration of a conventional photodetection circuit to be used in the transceiver of FIG. 4.
Figure 10:
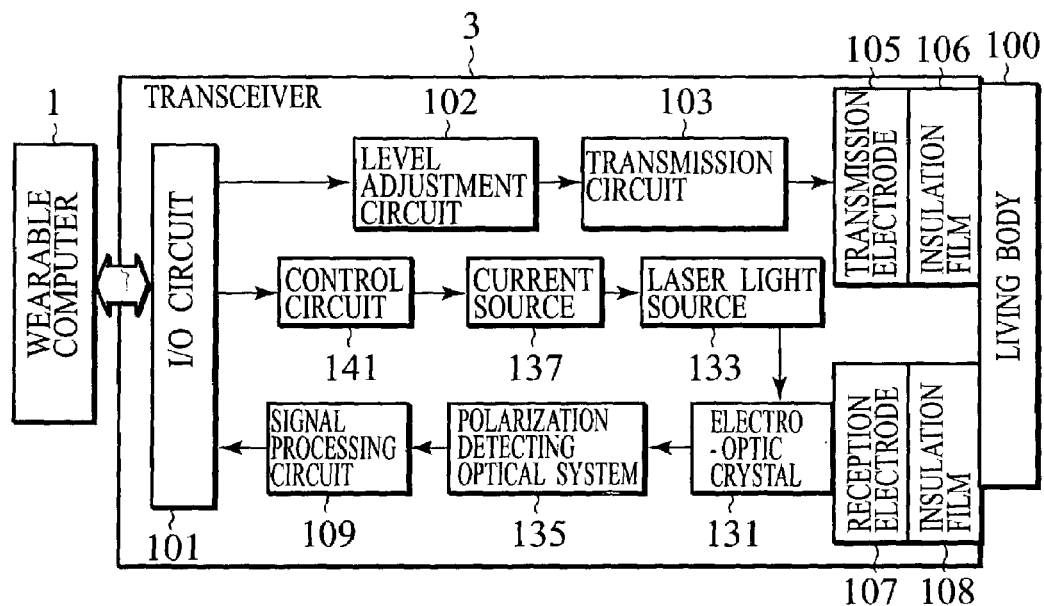
FIG. 10 is a block diagram showing one exemplary configuration of a transceiver according to the third embodiment of the present invention.

FIG. 10 shows a circuit configuration of a transceiver according to the third embodiment of the present invention. The transceiver of FIG. 10 differs from the conventional transceiver of FIG. 3 in that a control circuit 141 is provided and the current source 137 for operating the laser light source 133 is controlled by this control circuit 141. The rest of the configuration and the operation of the transceiver of FIG. 10 are the same as those of FIG. 3, and the same reference numerals are given to the corresponding elements.

Figure 11:
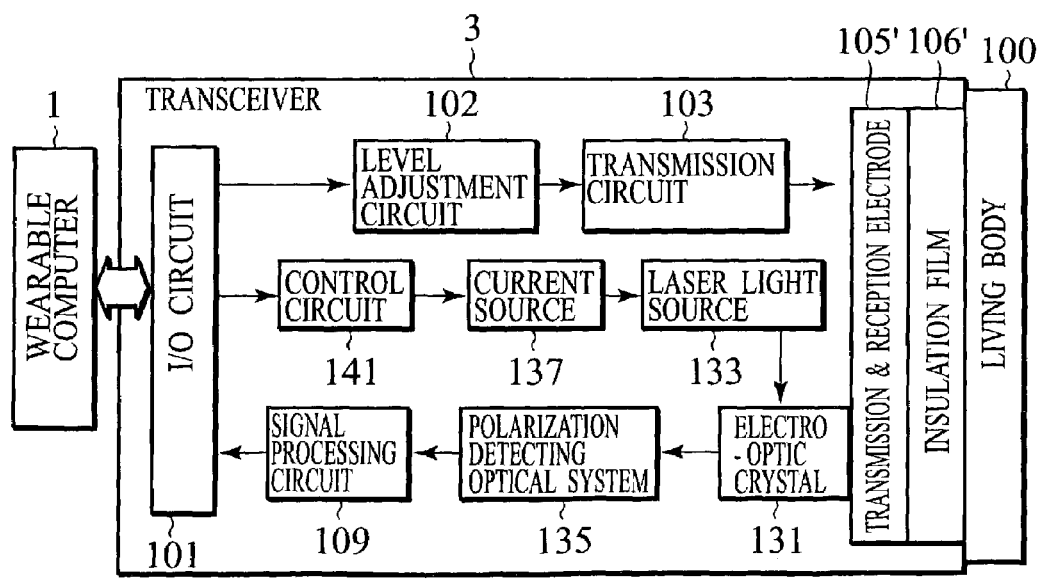
FIG. 11 is a block diagram showing another exemplary configuration of a transceiver according to the third embodiment of the present invention.

Note that the configuration of FIG. 10 can be modified to that shown in FIG. 11, where the transmission electrode 105 and the reception electrode 107 of FIG. 10 are integrally provided as a transmission and reception electrode 105' in FIG. 11, and the insulation films 106 and 108 of FIG. 10 are integrally provided as an insulation film 106' in FIG. 11.

The control circuit 141 monitors the operation state of the transceiver 3, controls the current source 137 that supplies currents to the laser light source 133 according to the operation state, and imposes the limitation such as that in which the operation of the laser light source 133 is stopped in the transmission state in which the laser light is unnecessary, for example, so as to reduce the power consumption of the transceiver 3.

Figure 12:
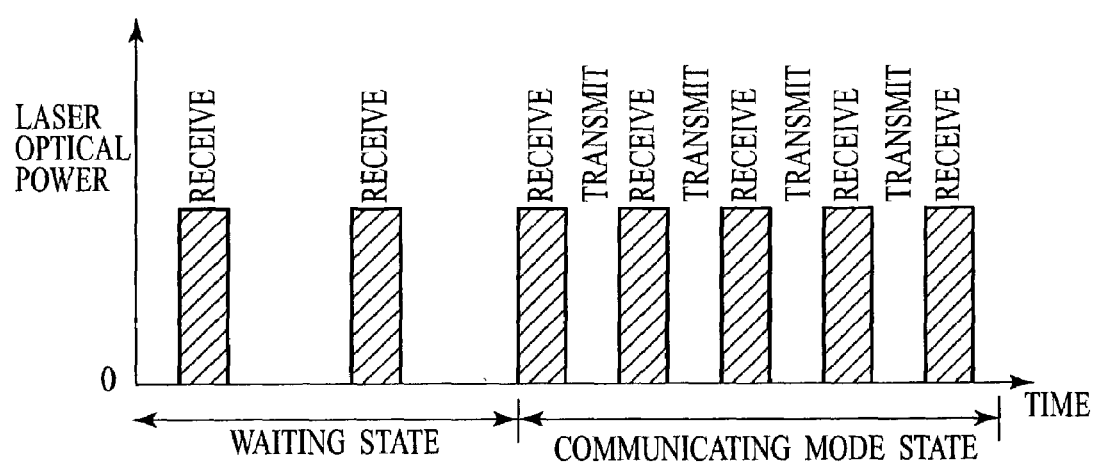
FIG. 12 is a graph of a laser optical power versus time for explaining one exemplary operation of the transceiver of FIG. 10 or FIG. 11.

More specifically, the transceiver 3 has the transmission state, the reception state, the waiting state, and the communicating mode state, and in this embodiment, as shown in a graph of the laser optical power versus time shown in FIG. 12, the control circuit 141 controls the current source 137 to supply the currents to the laser light source 133 only when the transceiver 3 is in the reception state, i.e., whenever the control unit 141 judges that the transceiver 3 is in the reception state during either one of the waiting state and the communicating mode state, such that the laser light source 133 generates the stationary level or full state laser light, so that the electric fields from the other transceivers can be received. Note that, in FIG. 12, the reception state and the transmission state are indicated by "receive" and "transmit" described over graphs representing the laser optical powers.

Then, the control circuit 141 controls the current source 137 not to supply the currents to the laser light source 133 in the states other than the reception state, such that the output of the laser light from the laser light source 133 is stopped and the power consumption is reduced.

Figure 13:
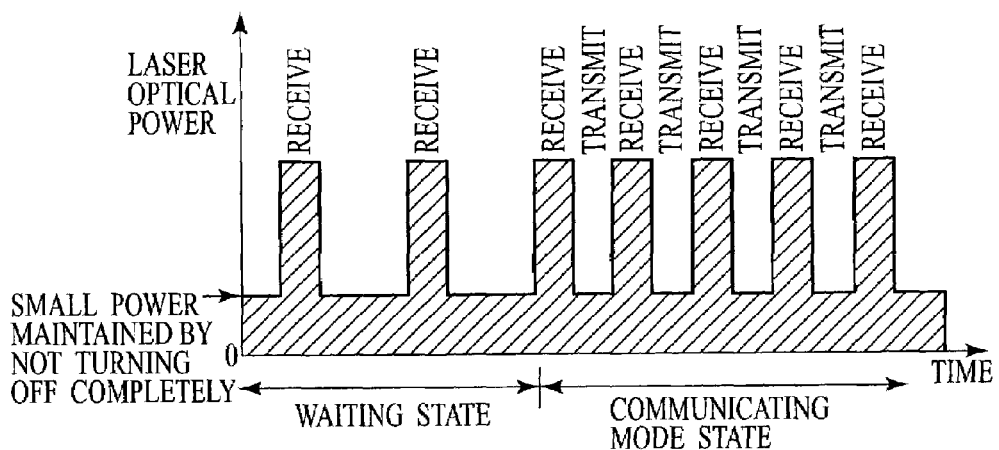
FIG. 13 is a graph of a laser optical power versus time for explaining another exemplary operation of the transceiver of FIG. 10 or FIG. 11.

FIG. 13 shows another graph of the laser optical power versus time for explaining another exemplary operation of the transceiver 3 according to this third embodiment of the present invention.

In this case, the configuration of the transceiver 3 is the same as that shown in FIG. 10, but the control by the control circuit 141 is different.

Namely, in this case, when the control circuit 141 judges that the transceiver 3 is in the reception state, the control circuit 141 controls the current source 137 to supply the currents of the stationary level to the laser light source 133 during this reception state, such that the laser light source 133 generates the stationary level of full state laser light, so that the electric fields from the other transceivers can be received, similarly as in the case of FIG. 12.

On the other hand, in the case of the states other than the reception state, if the laser light output from the laser light source 133 is stopped as in the case of FIG. 12, there can be cases where the laser light source 133 cannot be re-activated quickly when an attempt is made to operate the laser light source 133 from this stopped state.

For this reason, in the case shown in FIG. 13, the control circuit 141 controls the current source 137 to supply the currents at a prescribed low level that is lower than the stationary level to the laser light source 133 in the states other than the reception state, such that the laser light source 133 is not completely turned OFF and maintained at some small power of the warming up level even in the states other than the reception state. In this way, even when the state changes to the reception state from this state, the laser light source 133 can be re-activated quickly to generate the stationary level or full state laser light when the stationary level currents are supplied. Note that, in FIG. 13, the reception state and the transmission state are indicated by "receive" and "transmit" described over graphs representing the laser optical powers, similarly as FIG. 12.

Note that it suffices for the currents of the prescribed low level to be the minimum necessary currents such that the laser light source 133 can be re-activated quickly to generate the stationary level or full state laser light when the stationary level currents for enabling the generation of the stationary level or full state laser light are supplied in the state where the currents of the prescribed low level are supplied.

By maintaining the laser light source 133 at some small power without turning it OFF completely by supplying the low level currents to the laser light source 133 in the states other than the reception state as described above, the power consumption will be increased slightly compared with the case of FIG. 12, but the re-activation of the laser light source 133 can be made quick, the operation error in the reception state can be eliminated, and the reliability can be improved.

Figure 14:
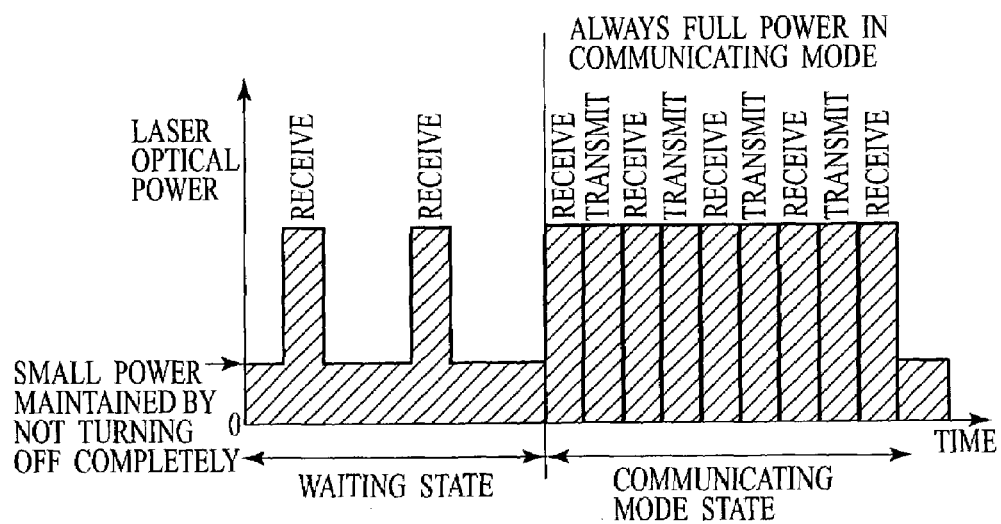
FIG. 14 is a graph of a laser optical power versus time for explaining another exemplary operation of the transceiver of FIG. 10 or FIG. 11.

FIG. 14 shows another graph of the laser optical power versus time for explaining another exemplary operation of the transceiver 3 according to this third embodiment of the present invention.

In this case, the configuration of the transceiver 3 is the same as that shown in FIG. 10, but the control by the control circuit 141 is different.

Namely, in this case, the control circuit 141 controls the current source 137 to supply the stationary level currents to the laser light source 133 such that the laser light source 133 generates the stationary level or full state laser light, both in the reception state and the transmission state during the communicating mode state when the transceiver 3 is in the communicating mode state, as indicated in the second half of FIG. 14, so as to improve the reliability of the transmission and reception in the case where the transmission and the reception are alternated repeatedly in succession as in the case of the communicating mode state.

Also, besides the communicating mode state, the control circuit 141 controls the current source 137 to supply the stationary level currents to the laser light source 133 such that the laser light source 133 generates the stationary level or full state laser light in the reception state, i.e., the reception state during the waiting state, as indicated in the first half of FIG. 14, similarly as in the case of FIG. 13. Then, the control circuit 141 controls the current source 137 to supply the currents at a prescribed low level that is lower than the stationary level to the laser light source 133 in the states other than the reception state during the waiting state, such that the laser light source 133 is not completely turned OFF and maintained at some small power of the warming up level even in the states other than the reception state. In this way, even when the state changes to the reception state from this state, the laser light source 133 can be re-activated quickly to generate the stationary level or full state laser light when the stationary level currents are supplied. Note that, in FIG. 14, the reception state and the transmission state are indicated by "receive" and "transmit" described over graphs representing the laser optical powers, similarly as FIG. 13.

Note that the above description is directed to the case of using the laser light source 133, but this embodiment is not necessarily limited to the case of using the laser light source.

As described, according to this embodiment, the operation of the light source is controlled according to the operation state of the transceiver, so that it is possible to reduce the power consumption by stopping the operation of the light source when the transceiver is in the transmission state that does not require the light source, for example.

Also, according to this embodiment, the light is generated from the light source by supplying the currents to the light source only when the transceiver is in the reception state, so that it is possible to reduce the power consumption as the currents are not supplied to the light source in the states other than the reception state.

Also, according to this embodiment, the light is generated from the light source by supplying the currents to the light source when the transceiver is in the reception state, and the low level currents are supplied to the light source in the states other than the reception state to maintain the light source at some small power, such that the re-activation of the light source can be made quick, the operation error in the reception state is eliminated, and the reliability can be improved.

Also, according to this embodiment, the light is generated from the light source by supplying the currents to the light source when the transceiver is in the reception state or in the communicating mode state, and the low level currents are supplied to the light source in the other states, so as to improve the reliability of the transmission and reception in the case where the transmission and the reception are alternated repeatedly in succession as in the case of the communicating mode state. Also, the low level currents are supplied to the light source in the other states to maintain the light source at some small power, such that the re-activation of the light source can be made quick, the operation error in the reception state is eliminated, and the reliability can be improved.

Referring now to FIG. 15 to FIG. 19, the fourth embodiment of the present invention related to the electric field detecting optical device will be described in detail.

Figure 15:
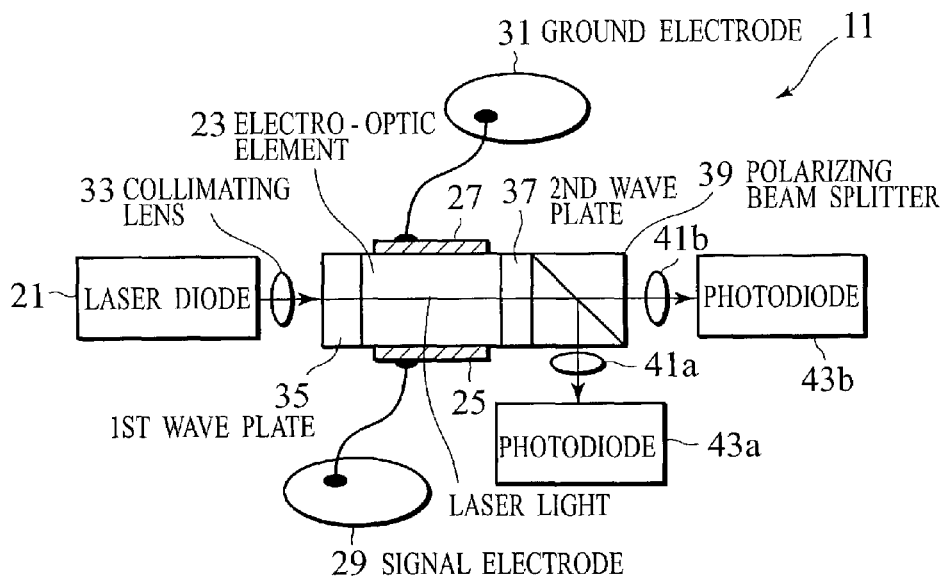
FIG. 15 is a diagram showing a first exemplary configuration of an electric field detecting optical device to be used in a transceiver according to the fourth embodiment of the present invention.

FIG. 15 shows a first exemplary configuration of the electric field detecting optical device according to this embodiment.

The electric field detecting optical device 11 of FIG. 15 is to be used as the electric field detecting optical unit 110 in the transceiver 3 of the first to third embodiments described above, in the case of putting the wearable computer 1 on the living body 100 which is an electric field propagating medium and enabling the data communications with the other wearable computers and data communication devices.

The electric field detecting optical device 11 of FIG. 15 detects the electric fields by the electro-optic method using laser lights and electro-optic crystals, and has a laser diode 21 constituting a laser light source and an electro-optic element 23 in a form of an electro-optic crystal. Note that the electro-optic element 23 of this embodiment is sensitive only to electric fields coupled in a direction perpendicular to a propagating direction of the laser light from the laser diode 21, where the optical characteristic, i.e., the birefringence, is changed by the electric field strength and the polarization of the laser light is changed by the change of the birefringence.

Note also that the laser light outputted from the laser diode 21 is used in this embodiment, but it is not necessarily limited to the laser light and it suffices to be a single wavelength light, so that it is also possible to use the light outputted from a light emitting diode (LED), for example. This applies equally to the subsequent exemplary configurations of this embodiment as well.

Also, the electro-optic element 23 preferably has a square pillar shape, but it is not necessarily limited to the square pillar shape and it may be any other shape such as a cylindrical shape.

On two opposing side faces along the vertical direction in the figure of the electro-optic element 23, first and second electrodes 25 and 27 are provided. Note that the first and second electrodes 25 and 27 are arranged such that they are pinching a propagating direction of the laser light from the laser diode 21 in the electro-optic element 23 from both sides and coupling the electric field perpendicularly with respect to the laser light as will be described below.

The electric field detecting device 11 has a signal electrode 29 that constitutes the reception electrode 107 of the transceiver 3, and this signal electrode 29 is connected to the first electrode 25. Also, the second electrode 27 facing against the first electrode 25 is connected to a ground electrode 31, such that it functions as a ground electrode with respect to the first electrode 25. Note that the ground electrode 31 functions as a ground by being connected to a battery of the transceiver 3 or a large metal, for example, and plays a role of improving the coupling of the electric field from the first electrode 25 to the electro-optic element 23, but the ground electrode 31 is not absolutely necessary. This equally applies to the subsequent exemplary configurations of this embodiment as well.

The signal electrode 29 constitutes the reception electrode 107, which detects the electric fields induced in and propagated through the living body 100, propagates these electric fields to the first electrode 25, and couples them to the electro-optic element 23 through the first electrode 25.

The laser light outputted from the laser diode 21 is turned into parallel beam through a collimating lens 33, and the parallel beam of the laser light is injected into the electro-optic element 23 after its polarization state is adjusted by a first wave plate 35. The laser light injected into the electro-optic element 23 is propagated between the first and second electrodes 25 and 27, and while this laser light is propagating, the signal electrode 29 detects the electric field induced in and propagated through the living body 100 as described above and couples this electric field to the electro-optic element 23 through the first electrode 25. This electric field is formed from the first electrode 25 toward the second electrode 27 connected to the ground electrode 31, and because it is perpendicular to the propagating direction of the laser light injected into the electro-optic element 23 from the laser diode 21, the birefringence as the optical characteristic of the electro-optic element 23 is changed as described above, and as a result the polarization of the laser light is changed.

The laser light with the polarization changed by the electric field from the first electrode 25 in the electron optic element 23 in this way is then injected into the polarizing beam splitter 39 after its polarization state is adjusted by the second wave plate 37. The polarizing beam splitter 39 constitutes an analyzer and is also called a polarizer, which splits the laser light into the P-polarization component and the S-polarization component and converts them into the light intensity changes. The P-polarization component and the S-polarization component split from the laser light by the polarizing beam splitter 39 are respectively collected by the first and second focusing lenses 41a and 41b and supplied into the first and second photodiodes 43a and 43b that constitute the photoelectric conversion unit, such that the P-polarization light signal and the S-polarization light signal are converted into the respective electric signals and outputted from the first and second photodiodes 43a and 43b.

Note that, in this embodiment, both the P-polarization component and the S-polarization component split by the polarizing beam splitter 39 are converted into the electric signals and outputted by the first and second photodiodes 43a and 43b respectively, but it is also possible to provide only one of the first and second photodiodes 43a and 43b and only one of the first and second focusing lenses 41a and 41b such that only one of the P-polarization component and the S-polarization component is converted into the electric signals and outputted. This also applies to the other exemplary configurations of the electric field detecting optical device according to this embodiment.

As described above, the electric signals outputted from the first and second photodiodes 43*a* and 43*b* are applied with the signal processings such as the amplification, the noise removal and the waveform shaping at the signal processing circuit 109 and then supplied to the wearable computer 1 through the I/O circuit 101.

Figure 16:
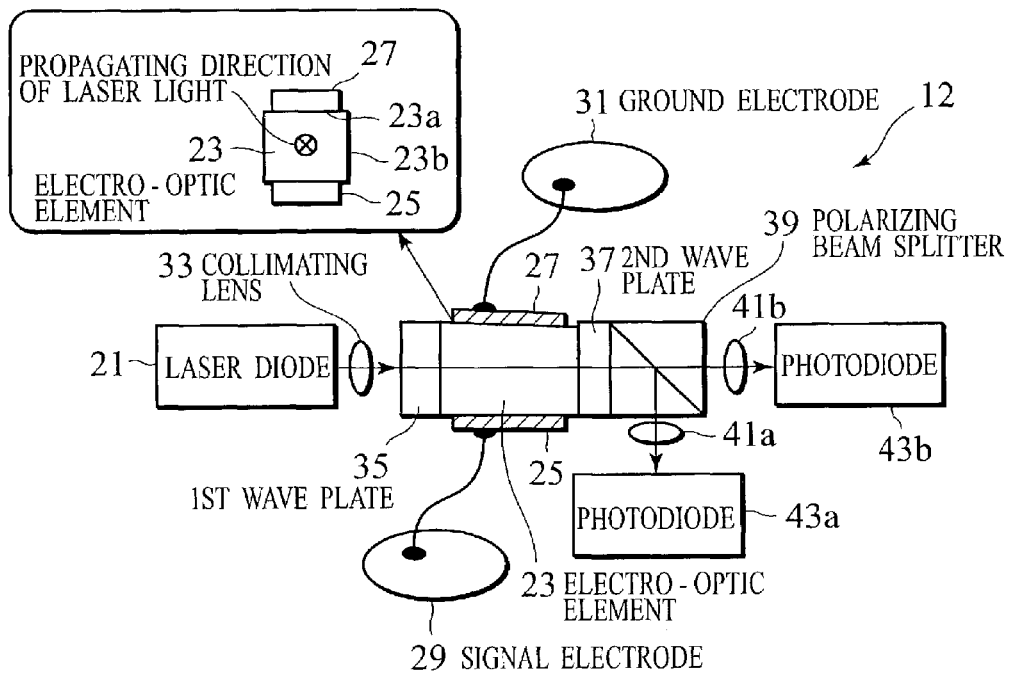
FIG. 16 is a diagram showing a second exemplary configuration of an electric field detecting optical device to be used in a transceiver according to the fourth embodiment of the present invention.

Next, FIG. 16 shows a second exemplary configuration of the electric field detecting optical device according to this embodiment.

The electric field detecting optical device 12 of FIG. 16 differs from that of FIG. 15 in that the two non-opposing side faces 23*a* and 23*b* of the electro-optic element 23 are shaped obliquely with respect to the propagating direction of the laser light to form slope sections. The rest of the configuration and the operation of the electric field detecting optical device 12 are the same as those of FIG. 15.

The electro-optic element 23 has a property that, when the electric field is applied, it exhibits the phenomenon called inverse piezo-electric effect in which the crystal constituting the electro-optic element 23 is physically distorted. The polarization of the laser light is changed by the distortion due to this inverse piezo-electric effect, but this change is usually small. However, when the electric field is changed at a certain frequency, the physical distortion of the electro-optic element 23 is also changed at that frequency, and when this change resonates with the distance between the opposing faces of the crystal, the effect becomes large and the polarization change becomes quite large. When such a resonance occurs, the waveform will be distorted to cause the communication error.

For this reason, in the electric field detecting optical device 12 of FIG. 16, two non-opposing side faces 23*a* and 23*b* of the electro-optic element 23 are shaped obliquely in order to prevent such a resonance due to the inverse piezo-electric effect from occurring. Note that the slope angle with respect to the propagating direction of the laser light is preferably 0.5° to 1.0°. By preventing the resonance by shaping the side faces 23*a* and 23*b* of the electro-optic element 23 obliquely in this way, it is possible to flatten the frequency characteristic, so that it becomes possible to surely prevent the communication error due to the waveform distortion.

Figure 17:
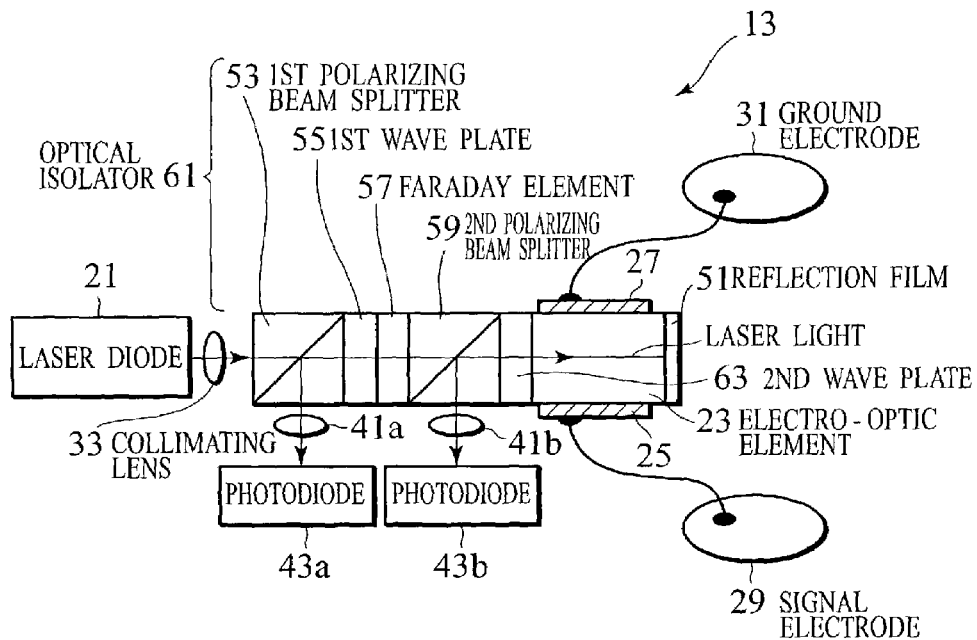
FIG. 17 is a diagram showing a third exemplary configuration of an electric field detecting optical device to be used in a transceiver according to the fourth embodiment of the present invention.

Next, FIG. 17 shows a third exemplary configuration of the electric field detecting optical device according to this embodiment.

The electric field detecting optical device 13 of FIG. 17 is similar to that of FIG. 15 in that it has the laser diode 21 and the electro-optic element 23 and detects the electric fields by the electro-optic method, but differs from that of FIG. 15 in that, in contrast to the electric field detecting optical device 11 of FIG. 15 which is a transmission type in which the laser light transmits through the electro-optic element 23, the electric field detecting optical device 13 of FIG. 17 is a reflection type in which a reflection film 51 is provided at an end face on opposite side of an end face of the electro-optic element 23 at which the laser light from the laser diode 21 is injected, such that the laser light propagated through the electro-optic element 23 is reflected by the reflection film 51 and outputted from the injection end face.

Namely, the electric field detecting optical device 13 of FIG. 17 is similar to the electric field detecting optical device 11 of FIG. 15 in that it has a collimating lens 33 for turning the laser light from the laser diode 21 into the parallel beam, the first and second electrodes 25 and 27 provided at two opposing side faces of the electro-optic element 23, the signal electrode 29 and the ground element 31 connected to the first and second electrodes 25 and 27 respectively, the first and second focusing lenses 41*a* and 41*b* for collecting the P-polarization component and the S-polarization component of the laser light, and the first and second photodiodes 43*a* and 43*b* for respectively converting the P-polarization light signal and the S-polarization light signal collected by the first and second focusing lenses 41*a* and 41*b* into electric signals.

In addition to these constituent elements, the electric field detecting optical device 13 of FIG. 17 has an optical isolator 61 for passing the laser light injected from the collimating lens 33 toward the electro-optic element 23, splitting the returning laser light reflected by the reflection film 51 of the electro-optic element 23 into the P-polarization component and the S-polarization component, and converting them into the light intensity changes, and a second wave plate 63 for adjusting the polarization state of the laser light, which are provided between the collimating lens 33 and the electro-optic element 23, where the optical isolator 61 comprises a first polarizing beam splitter 53, a first wave plate 55 formed by a $\lambda/2$ wave plate, a Faraday element 57, and a second beam splitter 59.

In the optical isolator 61, the first polarizing beam splitter 53 passes the laser light from the collimating lens 33 while splitting the P-polarization component or the S-polarization component from the reflected light coming from the electro-optic element 23, converting it into the light intensity change and injecting it into the first focusing lens 41*a*. The first wave plate 55 formed by the $\lambda/2$ wave plate adjusts the polarization state of the laser light coming from the collimating lens 33 by passing through the first polarizing beam splitter 53 and the reflected light coming from the electro-optic element 23. The Faraday element 57 rotates the polarization plane of the laser light with its polarization state adjusted by the first wave plate 55 and the reflected light coming from the electro-optic element 23. The second polarizing beam splitter 59 passes the laser light coming from the Faraday element 57 to the electro-optic element 23, while splitting the S-polarization component or the P-polarization component from the reflected light coming from the electro-optic element 23, converting it into the light intensity change and injecting it into the second focusing lens 41*b*.

In further detail, the optical isolator 61 passes the laser light coming from the collimating lens 33, and the second wave plate 63 adjusts the polarization state of the laser light and injects it into the electro-optic element 23. While this injected laser light propagates through the electro-optic element 23 between the first and second electrodes 25 and 27, the signal electrode 29 detects the electric field induced in and propagated through the living body 100 and couples this electric field to the electro-optic element 23 through the first electrode 25. This electric field is formed from the first electrode 25 toward the second electrode 27 connected to the ground electrode 31, and because it is perpendicular to the propagating direction of the laser light injected into the electro-optic element 23 from the laser diode 21, the birefringence as the optical characteristic of the electro-optic element 23 is changed, and as a result the polarization of the laser light is changed.

The laser light with the polarization state changed as a result of passing through the electro-optic element 23 with the optical characteristic changed by the electric field then reaches to the reflection film 51 and is reflected by the reflection film 51. The polarization state is similarly changed while returning in the opposite direction through the electro-optic element 23, and the laser light outputted from the electro-optic element 23 is injected into the optical isolator 61, split into the P-polarization component and the S-polarization component and converted into light intensity changes and outputted by the first and second polarizing beam splitters 53 and 59 of the optical isolator 61.

The P-polarization component and the S-polarization component of the laser light outputted from the first and second polarizing beam splitters 53 and 59 of the optical isolator 61 in this way are then collected by the first and second focusing lenses 41a and 41b, and injected into the first and second photodiodes 43a and 43b, where they are converted into electric signals and outputted.

In this exemplary configuration, the laser light passes through the electro-optic element 23 back and forth by being reflected at the reflection film 51 so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Figure 18:
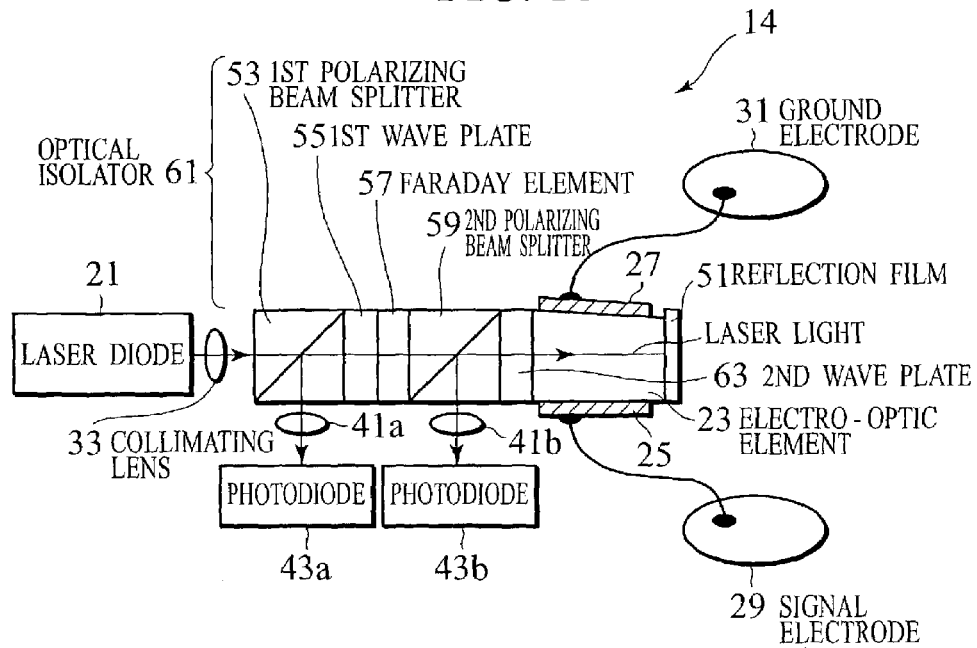
FIG. 18 is a diagram showing a fourth exemplary configuration of an electric field detecting optical device to be used in a transceiver according to the fourth embodiment of the present invention.

Next, FIG. 18 shows a fourth exemplary configuration of the electric field detecting optical device according to this embodiment.

The electric field detecting optical device 14 of FIG. 18 differs from that of FIG. 17 in that the two non-opposing side faces of the electro-optic element 23 are shaped obliquely with respect to the propagating direction of the laser light to form slope sections, so as to prevent the resonance due to the inverse piezo-electric effect of the electro-optic element 23, flatten the frequency characteristic, and prevent the communication error due to the waveform distortion from occurring. The rest of the configuration and the operation of the electric field detecting optical device 14 are the same as those of FIG. 17.

Note that in FIG. 18, only an upper side face of the electro-optic element 23 is shown to be shaped obliquely, but a side face adjacent to and not opposing this upper side face is actually also shaped obliquely.

Figure 19:
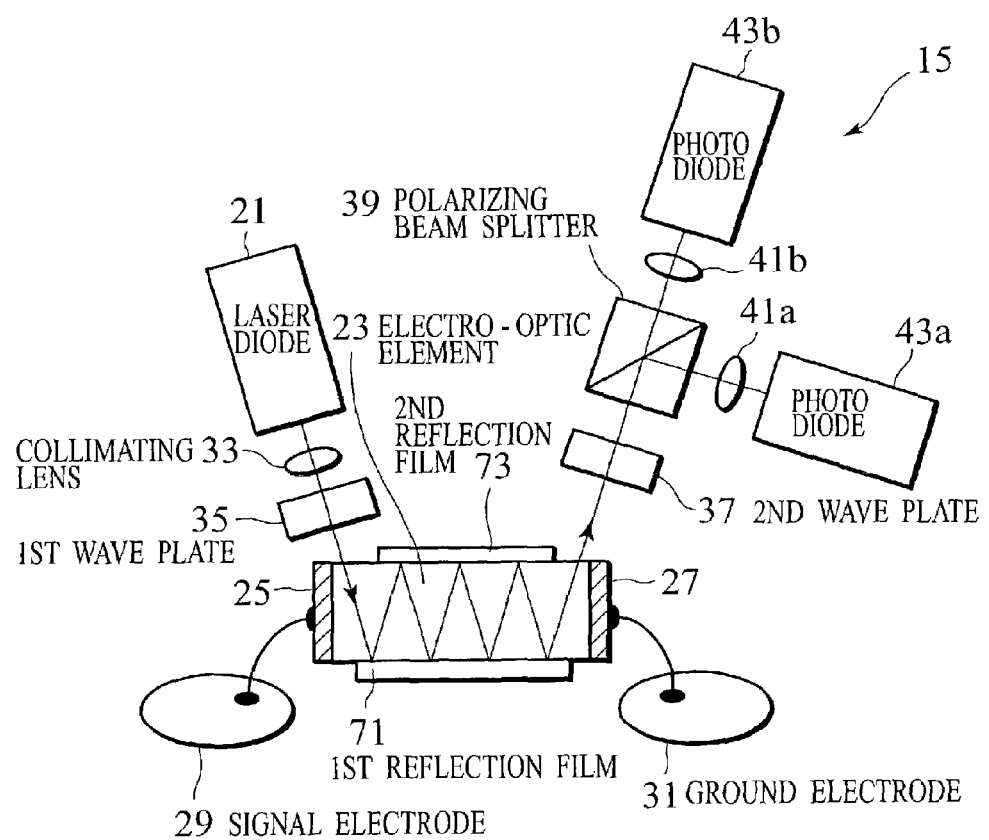
FIG. 19 is a diagram showing a fifth exemplary configuration of an electric field detecting optical device to be used in a transceiver according to the fourth embodiment of the present invention.

Next, FIG. 19 shows a fifth exemplary configuration of the electric field detecting optical device according to this embodiment.

The electric field detecting optical device 15 of FIG. 19 is similar to that of FIG. 15 in that it has the laser diode 21 and the electro-optic element 23 and detects the electric fields by the electro-optic method, but differs from that of FIG. 15 in that, in contrast to the electric field detecting optical device 11 of FIG. 15 which is a straight transmission type in which the laser light transmits through the electro-optic element 23 straight, the electric field detecting optical device 15 of FIG. 19 is a multiple reflection transmission type in which the laser light transmits through the electro-optic element 23 while making multiple reflections.

Note that the electro-optic element 23 is basically the same as before in that it has a sensitivity for the electric field perpendicular to the propagating direction of the laser light and changes its optical characteristic according to the coupled electric field strength similarly as in the above, but the propagating direction of the laser light and the direction of the electric field need not be strictly perpendicular, and it suffices to be nearly perpendicular as shown in FIG. 19, i.e., it may be deviated somewhat from being strictly perpendicular.

In order to make the multiple reflections of the laser light in the electro-optic element 23 while coupling the electric field nearly perpendicularly with respect to the propagating direction of the multiply reflected laser light in this way, the electric field detecting optical device 15 of FIG. 19 has first and second reflection films 71 and 73 provided on two side faces that are opposing to each other along a direction perpendicular to an opposing direction of the side faces of the electro-optic element 23 on which the first and second electrodes 25 and 27 are provided, such that the laser light is multiply reflected between these first and second reflection films 71 and 73. Note that the rest of the configuration is basically the same as that of FIG. 15.

Then, the laser light from the laser diode 21 is turned into the parallel beam by the collimating lens 33, and after its polarization state is adjusted by the first wave plate 35, it is injected into the electro-optic element 23 from a space between the second reflection film 73 and the first electrode 25 toward the first reflection film 71 such that it is nearly perpendicular to the electric field between the first and second electrodes 25 and 27, multiply reflected by repeating the operation as shown in FIG. 19 in which it is reflected into a direction nearly perpendicular to the electric field similarly by the first reflection film 71, then it is reflected into a direction nearly perpendicular to the electric field by the second reflection film 73, and so on, and eventually outputted to the external from a space between the second reflection film 73 and the second electrode 27.

While the laser light is multiply reflected in the electro-optic element 23 in this way, the signal electrode 29 detects the electric field induced in and propagated through the living body 100 and couples this electric field to the electro-optic element 23 through the first electrode 25. This electric field is formed from the first electrode 25 toward the second electrode 27 connected to the ground electrode 31, and because it is nearly perpendicular to the propagating direction, i.e., the multiply reflected directions, of the laser light injected into the electro-optic element 23 from the laser diode 21 and multiply reflected therein, the birefringence as the optical characteristic of the electro-optic element 23 is changed, and as a result the polarization of the multiply reflected laser light is changed.

The laser light with the polarization state changed while being multiply reflected and outputted from the electro-optic element 23 is then injected into the polarizing beam splitter 39 after its polarization state is adjusted by the second wave plate 37. The polarizing beam splitter 39 splits the laser light from the second wave plate 37 into the P-polarization component and the S-polarization component and converts them into the light intensity changes. The P-polarization component and the S-polarization component split from the laser light by the polarizing beam splitter 39 are respectively collected by the first and second focusing lenses 41a and 41b and supplied into the first and second photodiodes 43a and 43b such that the P-polarization light signal and the S-polarization light signal are converted into the respective electric signals and outputted from the first and second photodiodes 43a and 43b.

In this exemplary configuration, the laser light is multiply reflected within the electro-optic element 23 so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Note that, it is also possible to modify this electric field detecting optical device 15 of FIG. 19 such that the two non-opposing side faces of the electro-optic element 23 are shaped obliquely with respect to the propagating direction of the laser light to form slope sections, so as to prevent the resonance due to the inverse piezo-electric effect of the electro-optic element 23, flatten the frequency characteristic, and prevent the communication error due to the waveform distortion from occurring, similarly as in the cases of FIG. 16 and FIG. 18.

As described, according to this embodiment, the electric field induced in and propagated through the electric field propagating medium is coupled to the electro-optic element through the first electrode, the parallel beam is injected into this electro-optic element, and it is split into the P-polarization component and the S-polarization component, converted into the light intensity changes by the analyzer, and at least one of the P-polarization component and the S-polarization component is converted into the electric signals and outputted, so that by applying this embodiment to the transceiver for the wearable computer, for example, it becomes possible to properly carry out the communications among the wearable computers, which do not require any cable lines, which are free from the cross-talking with the other radio systems, and which do not depend on the Earth ground.

Also, according to this embodiment, the electric field induced in and propagated through the electric field propagating medium is coupled to the electro-optic element through the first electrode, the parallel beam is injected into this electro-optic element to make the reflection or the multiple reflections, and the parallel beam outputted from the electro-optic element is split into the P-polarization component and the S-polarization component, converted into the light intensity changes, and at least one of the P-polarization component and the S-polarization component is converted into the electric signals and outputted, so that by applying this embodiment to the transceiver for the wearable computer, for example, it becomes possible to properly carry out the communications among the wearable computers, which do not require any cable lines, which are free from the cross-talking with the other radio systems, and which do not depend on the Earth ground.

In addition, the parallel beam is reflected or multiply reflected in the electro-optic element, so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Referring now to FIG. 20 to FIG. 25, the fifth embodiment of the present invention related to the electric field detecting optical device will be described in detail.

Figure 20:
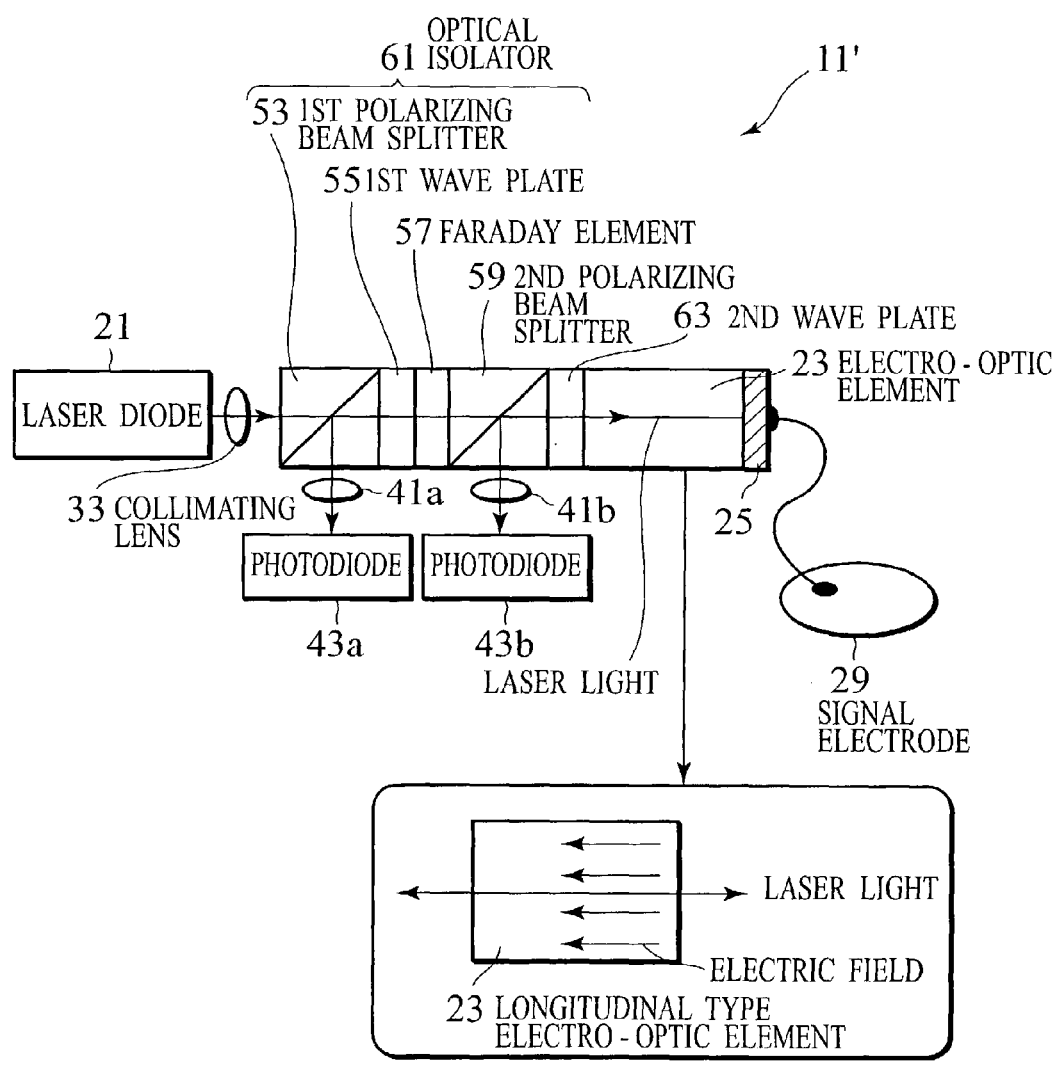
FIG. 20 is a diagram showing a first exemplary configuration of an electric field detecting optical device to be used in a transceiver according to the fifth embodiment of the present invention.

FIG. 20 shows a first exemplary configuration of the electric field detecting optical device according to this embodiment.

The electric field detecting optical device 11' of FIG. 20 is to be used as the electric field detecting optical unit 110 in the transceiver 3 of the first to third embodiments described above, in the case of putting the wearable computer 1 on the living body 100 which is an electric field propagating medium and enabling the data communications with the other wearable computers and data communication devices.

The electric field detecting optical device 11' of FIG. 20 detects the electric fields by the electro-optic method using laser lights and electro-optic crystals, and has a laser diode 21 constituting a laser light source and an electro-optic element 23 in a form of an electro-optic crystal. Note that the electro-optic element 23 of this embodiment is a longitudinal type electro-optic element which is sensitive only to electric fields coupled in a direction parallel to a propagating direction of the laser light from the laser diode 21, where the optical characteristic, i.e., the birefringence, is changed by the electric field strength and the polarization of the laser light is changed by the change of the birefringence, as indicated in FIG. 20.

Note also that the laser light outputted from the laser diode 21 is used in this embodiment, but it is not necessarily limited to the laser light and it suffices to be a single wavelength light, so that it is also possible to use the light outputted from a light emitting diode (LED), for example. This applies equally to the subsequent exemplary configurations of this embodiment as well.

Also, the electro-optic element 23 preferably has a square pillar shape, but it is not necessarily limited to the square pillar shape and it may be any other shape such as a cylindrical shape.

The laser light from the laser diode 21 is turned into the parallel beam by the collimating lens 33, passed through the optical isolator 61 formed by the first polarizing beam splitter 53, the first wave plate 55 formed by the $\lambda/2$ wave plate, the Faraday element 57, and the second polarizing beam splitter 59, and injected into the electro-optic element 23 after its polarization state is adjusted by the second wave plate 63. Note that the polarizing beam splitters 53 and 59 constitute the analyzer and are also called polarizers.

On an end face of the electro-optic element 23 opposite to the end face from which the laser light is injected, the first electrode 25 formed by a metallic mirror is provided such that the laser light injected into the electro-optic element 23 is reflected to a direction opposite to that of the injection direction by this first electrode 25. Also, the first electrode 25 is connected to the signal electrode 29 that constitutes the reception electrode 107, and this signal electrode 29 detects the electric field induced in and propagated through the living body 100 and this electric field is coupled to the electro-optic element 23 through the first electrode 25.

In the optical isolator 61, the first polarizing beam splitter 53 passes the laser light from the collimating lens 33 while splitting the P-polarization component or the S-polarization component from the reflected light coming from the electro-optic element 23, converting it into the light intensity change and injecting it into the first focusing lens 41a. The first wave plate 55 formed by the $\lambda/2$ wave plate adjusts the polarization state of the laser light coming from the collimating lens 33 by passing through the first polarizing beam splitter 53 and the reflected light coming from the electro-optic element 23. The Faraday element 57 rotates the polarization plane of the laser light with its polarization state adjusted by the first wave plate 55 and the reflected light coming from the electro-optic element 23. The second polarizing beam splitter 59 passes the laser light coming from the Faraday element 57 to the electro-optic element 23, while splitting the S-polarization component or the P-polarization component from the reflected light coming from the electro-optic element 23, converting it into the light intensity change and injecting it into the second focusing lens 41b.

In further detail, the optical isolator 61 passes the laser light coming from the collimating lens 33, and the second wave plate 63 adjusts the polarization state of the laser light and injects it into the electro-optic element 23. While this injected laser light propagates through the electro-optic element 23, the signal electrode 29 detects the electric field induced in and propagated through the living body 100 and couples this electric field to the electro-optic element 23 through the first electrode 25. Because this electric field is parallel to the propagating direction of the laser light injected into the electro-optic element 23 from the laser diode 21, the birefringence as the optical characteristic of the electro-optic element 23 is changed, and as a result the polarization of the laser light is changed.

The laser light with the polarization state changed as a result of passing through the electro-optic element 23 with the optical characteristic changed by the electric field is then reflected by the reflection film (the first electrode 25). The polarization state is similarly changed while returning in the opposite direction through the electro-optic element 23, and the laser light is outputted in a direction opposite to the injection direction from the electro-optic element 23. This laser light outputted from the electro-optic element 23 is injected into the optical isolator 61, split into the P-polarization component and the S-polarization component and converted into light intensity changes and outputted by the first and second polarizing beam splitters 53 and 59 of the optical isolator 61.

The P-polarization component and the S-polarization component of the laser light outputted from the first and second polarizing beam splitters 53 and 59 of the optical isolator 61 in this way are then collected by the first and second focusing lenses 41a and 41b, and injected into the first and second photodiodes 43a and 43b, where they are converted into electric signals and outputted.

Note that, in this embodiment, both the P-polarization component and the S-polarization component split by the polarizing beam splitters 53 and 59 are converted into the electric signals and outputted by the first and second photodiodes 43a and 43b respectively, but it is also possible to provide only one of the first and second photodiodes 43a and 43b and only one of the first and second focusing lenses 41a and 41b such that only one of the P-polarization component and the S-polarization component is converted into the electric signals and outputted. This also applies to the other exemplary configurations of the electric field detecting optical device according to this embodiment.

As described above, the electric signals outputted from the first and second photodiodes 43a and 43b are applied with the signal processings such as the amplification, the noise removal and the waveform shaping at the signal processing circuit 109 and then supplied to the wearable computer 1 through the I/O circuit 101.

In this exemplary configuration, the laser light passes through the electro-optic element 23 back and forth by being reflected at the reflection film (the first electrode 25) so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Figure 21:
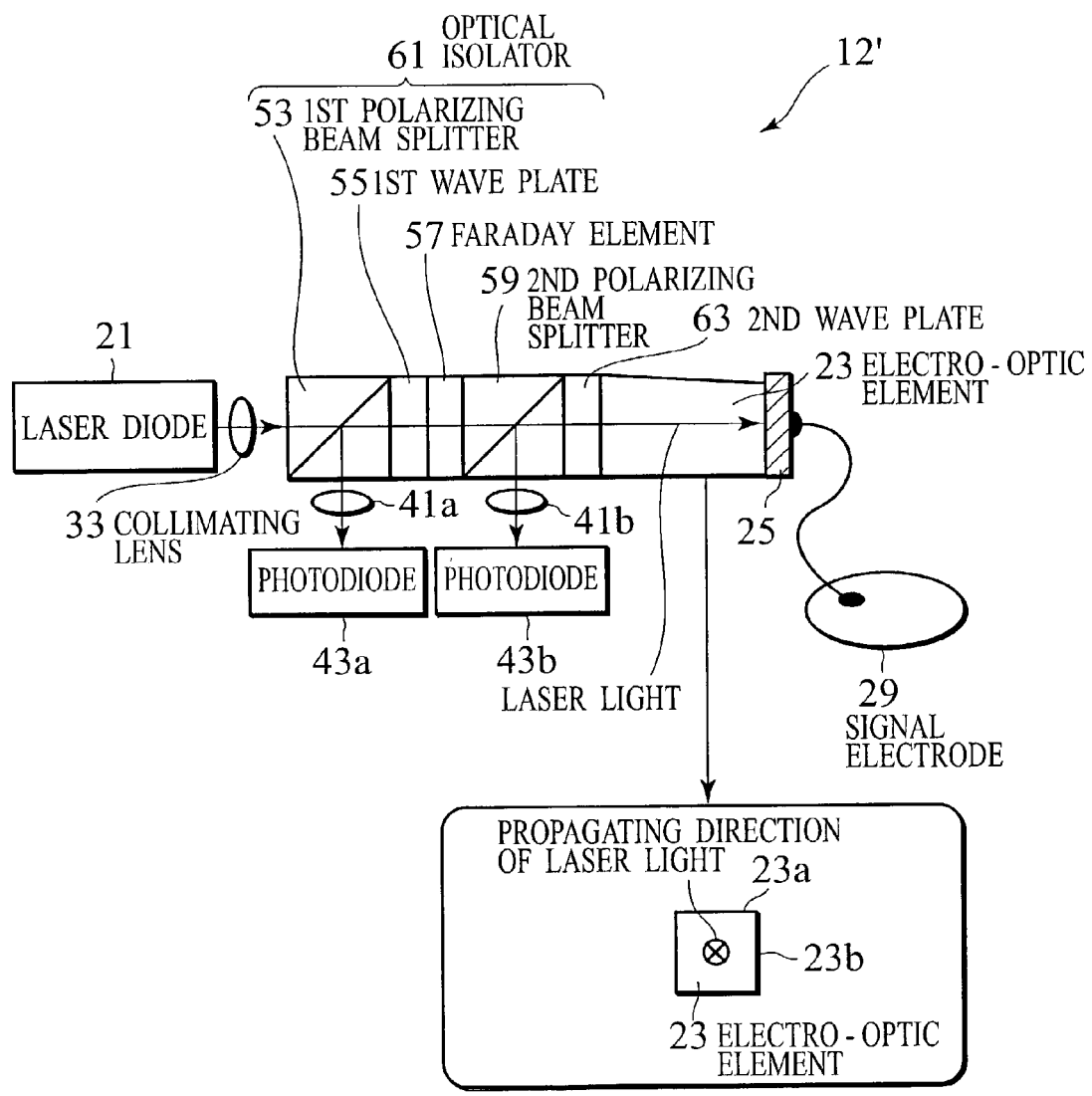
FIG. 21 is a diagram showing a second exemplary configuration of an electric field detecting optical device to be used in a transceiver according to the fifth embodiment of the present invention.

Next, FIG. 21 shows a second exemplary configuration of the electric field detecting optical device according to this embodiment.

The electric field detecting optical device 12' of FIG. 21 differs from that of FIG. 20 in that the two non-opposing side faces 23a and 23b of the electro-optic element 23 are shaped obliquely with respect to the propagating direction of the laser light to form slope sections. The rest of the configuration and the operation of the electric field detecting optical device 12' are the same as those of FIG. 20.

The electro-optic element 23 has a property that, when the electric field is applied, it exhibits the phenomenon called inverse piezo-electric effect in which the crystal constituting the electro-optic element 23 is physically distorted. The polarization of the laser light is changed by the distortion due to this inverse piezo-electric effect, but this change is usually small. However, when the electric field is changed at a certain frequency, the physical distortion of the electro-optic element 23 is also changed at that frequency, and when this change resonates with the distance between the opposing faces of the crystal, the effect becomes large and the polarization change becomes quite large. When such a resonance occurs, the waveform will be distorted to cause the communication error.

For this reason, in the electric field detecting optical device 12' of FIG. 21, two non-opposing side faces 23a and 23b of the electro-optic element 23 are shaped obliquely in order to prevent such a resonance due to the inverse piezo-electric effect from occurring. Note that the slope angle with respect to the propagating direction of the laser light is preferably 0.5° to 1.0°. By preventing the resonance by shaping the side faces 23a and 23b of the electro-optic element 23 obliquely in this way, it is possible to flatten the frequency characteristic, so that it becomes possible to surely prevent the communication error due to the waveform distortion.

Figure 22:
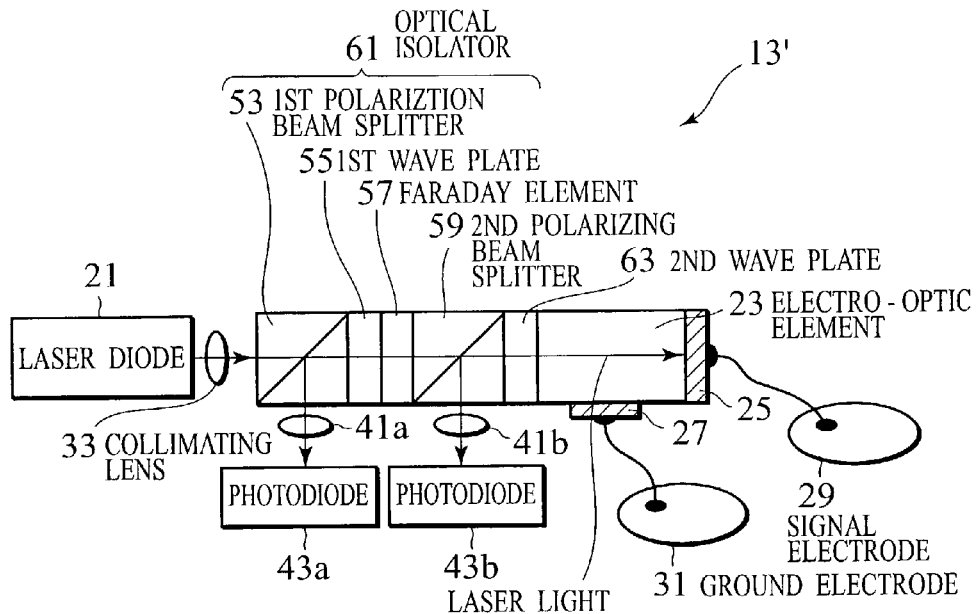
FIG. 22 is a diagram showing a third exemplary configuration of an electric field detecting optical device to be used in a transceiver according to the fifth embodiment of the present invention.

Next, FIG. 22 shows a third exemplary configuration of the electric field detecting optical device according to this embodiment.

The electric field detecting optical device 13' of FIG. 22 differs from that of FIG. 20 in that the second electrode 27 is provided on one side face of the electro-optic element 23, and this second electrode 27 is connected to the ground electrode 31 such that it functions as the ground electrode with respect to the first electrode 25. The rest of the configuration and the operation of the electric field detecting optical device 13' are the same as those of FIG. 20.

The second electrode 27 functions as a ground by being connected to a battery of the transceiver 3 or a large metal, for example, through the ground electrode 31, and plays a role of improving the coupling of the electric field from the first electrode 25 to the electro-optic element 23.

Figure 23:
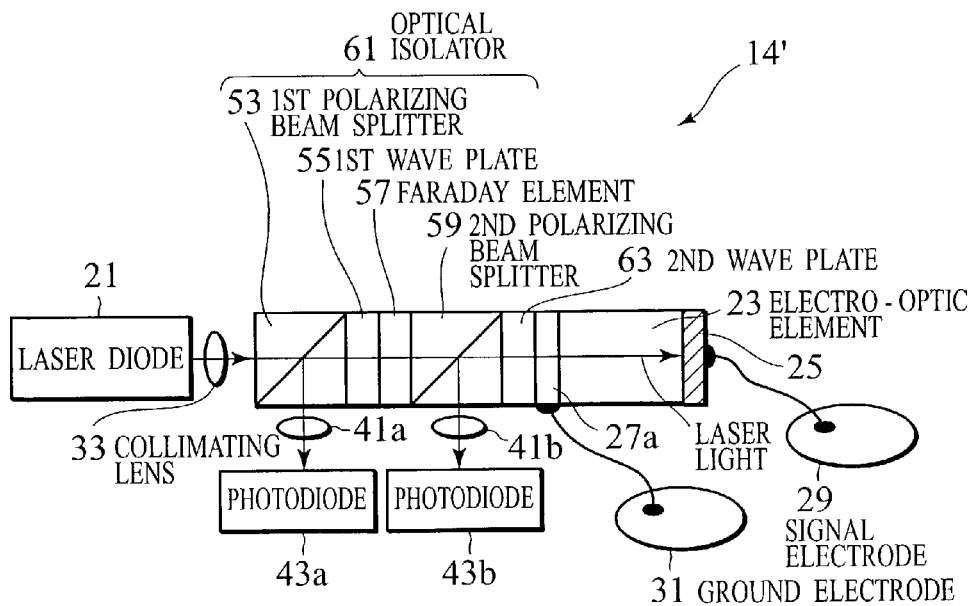
FIG. 23 is a diagram showing a fourth exemplary configuration of an electric field detecting optical device to be used in a transceiver according to the fifth embodiment of the present invention.

Next, FIG. 23 shows a fourth exemplary configuration of the electric field detecting optical device according to this embodiment.

The electric field detecting optical device 14' of FIG. 23 differs from that of FIG. 20 in that a transparent second electrode 27a formed by ITO (Indium Tin Oxide) for example is provided between the electro-optic element 23 and the second wave plate 63, and this second electrode 27a is connected to the ground electrode 31 such that it functions as the ground electrode with respect to the first electrode 25. The rest of the configuration and the operation of the electric field detecting optical device 13' are the same as those of FIG. 20.

The second electrode 27a functions as a ground by being connected to a battery of the transceiver 3 or a large metal, for example, through the ground electrode 31, and plays a role of improving the coupling of the electric field from the first electrode 25 to the electro-optic element 23, similarly as in the case of FIG. 22.

Note that the second electrode 27a is formed to be transparent so that it passes the laser light from the laser diode 21 and the reflected light from the electro-optic element 23 as they are.

Figure 24:
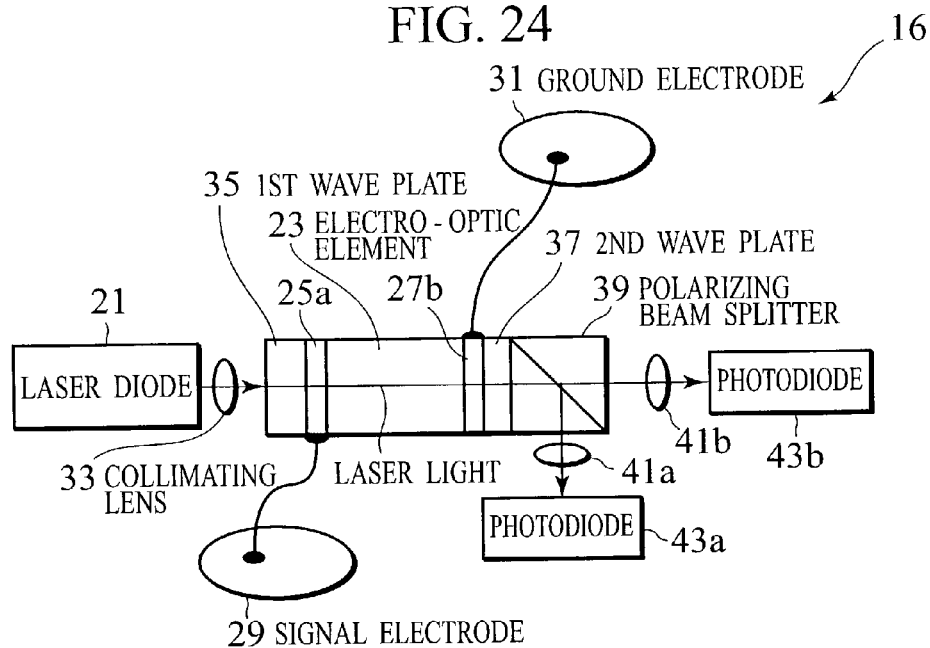
FIG. 24 is a diagram showing a fifth exemplary configuration of an electric field detecting optical device to be used in a transceiver according to the fifth embodiment of the present invention.

Next, FIG. 24 shows a fifth exemplary configuration of the electric field detecting optical device according to this embodiment.

The electric field detecting optical device 16 of FIG. 24 is similar to that of FIG. 20 in that it has the laser diode 21 and the electro-optic element 23 and detects the electric fields by the electro-optic method, but differs from that of FIG. 20 in that, in contrast to the electric field detecting optical device 11' of FIG. 20 which is a reflection type in which the laser light is reflected by a reflection film (the first electrode 25) provided at the other end face of the electro-optic element 23 so as to pass the electro-optic element 23 back and forth, the electric field detecting optical device 16 of FIG. 24 is a transmission type in which the laser light from the laser diode 21 transmits through the electro-optic element 23.

Note that the electro-optic element 23 is sensitive only to electric fields coupled in a direction parallel to a propagating direction of the laser light, and changes its optical characteristic according to the coupled electric field strength similarly as in the above.

In the electric field detecting optical device 16 of FIG. 24, the laser light from the laser diode 21 is turned into parallel beam through the collimating lens 33, and injected into the electro-optic element 23 after its polarization state is adjusted by the first wave plate 35. In this case, in order to generate the electric field parallel to the laser light in the electro-optic element 23, transparent first and second electrodes 25a and 27b formed by ITO for example are provided at two end faces of the electro-optic element 23, i.e., the injection end face and the output end face which is an end face opposing the injection end face, such that the laser light from the laser diode 21 is injected into the electro-optic element 23 through the transparent first electrode 25a.

The first electrode 25a and the second electrode 27b are connected to the signal electrode 29 and the ground electrode 31 respectively. The signal electrode 29 constitutes the reception electrode 107, which detects the electric fields induced in and propagated through the living body 100, propagates these electric fields to the first electrode 25a, and couples them to the electro-optic element 23 through the first electrode 25a. The second electrode 27b functions as a ground by being connected to a battery of the transceiver 3 or a large metal, for example, through the ground electrode 31 and plays a role of improving the coupling of the electric field from the first electrode 25a to the electro-optic element 23, but the second electrode 27b and the ground electrode 31 are not absolutely necessary.

Note that, in the configuration described above, the first electrode 25a and the second electrode 27b are arranged such that the first electrode 25a provided on the injection end face of the electro-optic element 23 is connected to the signal electrode 29 so that the electric field is coupled to the electro-optic element 23 from the signal electrode 29 through the first electrode 25a, while the second electrode 27b provided on the output end face is connected to the ground electrode 31, but the first electrode 25a and the second electrode 27b may be interchanged. Namely, it is also possible to use a configuration in which the second electrode 27b is connected to the signal electrode 29 so that the electric field is coupled to the electro-optic element 23 from the signal electrode 29 through the second electrode 27b, while the first electrode 25a is connected to the ground electrode 31.

The laser light injected into the electro-optic element 23 is propagated toward the second electrode 27b on the output end face, and while this laser light is propagating, the signal electrode 29 detects the electric field induced in and propagated through the living body 100 as described above and couples this electric field to the electro-optic element 23 through the first electrode 25a. This electric field is formed from the first electrode 25a toward the second electrode 27b connected to the ground electrode 31, and because it is parallel to the propagating direction of the laser light injected into the electro-optic element 23 from the laser diode 21, the birefringence as the optical characteristic of the electro-optic element 23 is changed as described above, and as a result the polarization of the laser light is changed.

The laser light with the polarization changed by the electric field from the first electrode 25a in the electro-optic element 23 in this way is then outputted from the electro-optic element 23, passed through the transparent second electrode 27b, and injected into the polarizing beam splitter 39 that constitutes an analyzer after its polarization state is adjusted by the second wave plate 37.

The polarizing beam splitter 39 splits the laser light into the P-polarization component and the S-polarization component and converts them into the light intensity changes. The P-polarization component and the S-polarization component split from the laser light by the polarizing beam splitter 39 are respectively collected by the first and second focusing lenses 41a and 41b and supplied into the first and second photodiodes 43a and 43b that constitute the photoelectric conversion unit, such that the P-polarization light signal and the S-polarization light signal are converted into the respective electric signals and outputted from the first and second photodiodes 43a and 43b.

As described above, the electric signals outputted from the first and second photodiodes 43a and 43b are applied with the signal processings such as the amplification, the noise removal and the waveform shaping at the signal processing circuit 109 and then supplied to the wearable computer 1 through the I/O circuit 101.

Note that, it is also possible to modify this electric field detecting optical device 16 of FIG. 24 such that the two non-opposing side faces of the electro-optic element 23 are shaped obliquely with respect to the propagating direction of the laser light to form slope sections, so as to prevent the resonance due to the inverse piezo-electric effect of the electro-optic element 23, flatten the frequency characteristic, and prevent the communication error due to the waveform distortion from occurring, similarly as in the case of FIG. 21.

Figure 25:
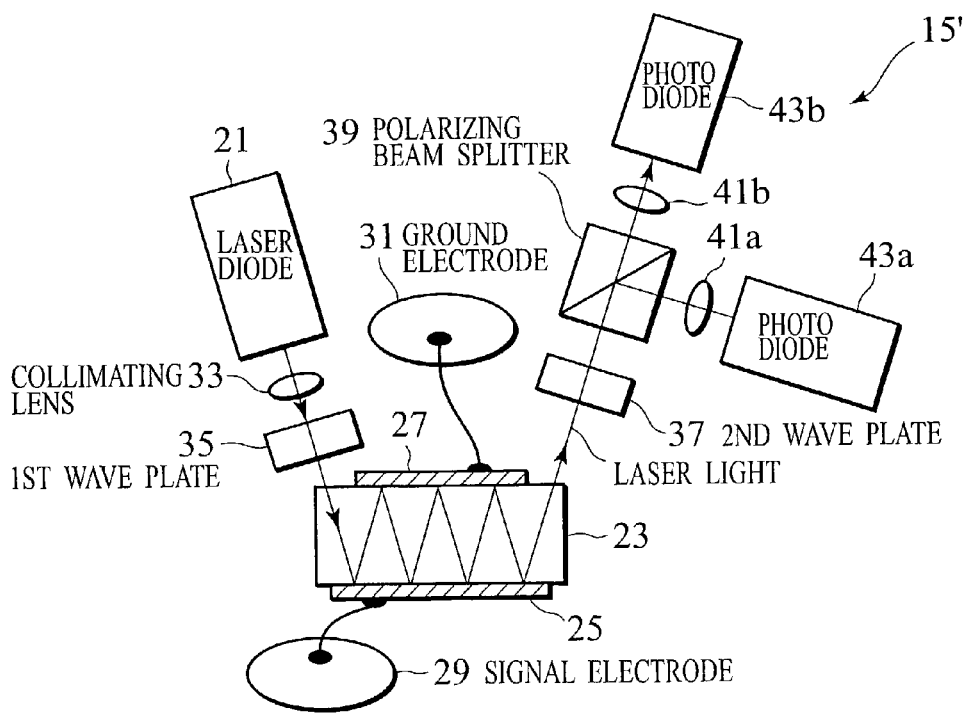
FIG. 25 is a diagram showing a sixth exemplary configuration of an electric field detecting optical device to be used in a transceiver according to the fifth embodiment of the present invention.

Next, FIG. 25 shows a sixth exemplary configuration of the electric field detecting optical device according to this embodiment.

The electric field detecting optical device 15' of FIG. 25 is similar to that of FIG. 24 in that it has the laser diode 21 and the electro-optic element 23 and detects the electric fields by the electro-optic method, but differs from that of FIG. 24 in that, in contrast to the electric field detecting optical device 16 of FIG. 24 which is a straight transmission type in which the laser light transmits through the electro-optic element 23 straight, the electric field detecting optical device 15' of FIG. 25 is a multiple reflection transmission type in which the laser light transmits through the electro-optic element 23 while making multiple reflections.

Note that the electro-optic element 23 is basically the same as before in that it has a sensitivity for the electric field parallel to the propagating direction of the laser light and changes its optical characteristic according to the coupled electric field strength similarly as in the above, but the propagating direction of the laser light and the direction of the electric field need not be strictly parallel, and it suffices to be nearly parallel as shown in FIG. 25, i.e., it may be deviated somewhat from being strictly parallel.

In order to make the multiple reflections of the laser light in the electro-optic element 23 while coupling the electric field nearly parallel with respect to the propagating direction of the multiply reflected laser light in this way, the electric field detecting optical device 15' of FIG. 25 has the first and second 25 and 27 formed by metallic mirrors provided on the injection end face and the other end face opposing the injection end face, respectively, such that the laser light injected from the laser diode 21 is multiply reflected between these first and second electrodes 25 and 27.

Also, the first and second electrodes 25 and 27 are connected to the signal electrode 29 and the ground electrode 31 respectively, similarly as in the above. Note that, in the configuration shown in FIG. 25, the second electrode 27 is provided on the end face from which the laser light is injected, and the first electrode 25 is provided on the other end face opposing the injection end face, but they can be interchanged. Also, the output end face of the laser light is set to be on the same side as the injection end face, but they may be set on different sides.

In the configuration of FIG. 25, the laser light from the laser diode 21 is turned into the parallel beam by the collimating lens 33, and after its polarization state is adjusted by the first wave plate 35, it is injected into the electro-optic element 23. In this injection, the laser light is injected into the electro-optic element 23 from a portion near one edge of the injection end face on which the second electrode 27 is provided, for example, such that it is nearly parallel to the electric field between the first and second electrodes 25 and 27, multiply reflected by repeating the operation as shown in FIG. 25 in which it is reflected into a direction nearly parallel to the electric field similarly by the first electrode 25, then it is reflected into a direction nearly parallel to the electric field by the second electrode 27, and so on, and eventually outputted to the external from a portion near another edge of the injection end face on which the second electrode 27 is provided.

While the laser light is multiply reflected in the electro-optic element 23 in this way, the signal electrode 29 detects the electric field induced in and propagated through the living body 100 and couples this electric field to the electro-optic element 23 through the first electrode 25. This electric field is formed from the first electrode 25 toward the second electrode 27 connected to the ground electrode 31, and because it is nearly parallel to the propagating direction, i.e., the multiply reflected directions, of the laser light injected into the electro-optic element 23 from the laser diode 21 and multiply reflected therein, the birefringence as the optical characteristic of the electro-optic element 23 is changed, and as a result the polarization of the multiply reflected laser light is changed.

The laser light with the polarization state changed while being multiply reflected and outputted from the electro-optic element 23 is then injected into the polarizing beam splitter 39 that constitutes an analyzer after its polarization state is adjusted by the second wave plate 37. The polarizing beam splitter 39 splits the laser light from the second wave plate 37 into the P-polarization component and the S-polarization component and converts them into the light intensity changes. The P-polarization component and the S-polarization component split from the laser light by the polarizing beam splitter 39 are respectively collected by the first and second focusing lenses 41*a* and 41*b* and supplied into the first and second photodiodes 43*a* and 43*b* such that the P-polarization light signal and the S-polarization light signal are converted into the respective electric signals and outputted from the first and second photodiodes 43*a* and 43*b*.

In this exemplary configuration, the laser light is multiply reflected within the electro-optic element 23 so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Note that, it is also possible to modify this electric field detecting optical device 15' of FIG. 25 such that the two non-opposing side faces of the electro-optic element 23 are shaped obliquely with respect to the propagating direction of the laser light to form slope sections, so as to prevent the resonance due to the inverse piezo-electric effect of the electro-optic element 23, flatten the frequency characteristic, and prevent the communication error due to the waveform distortion from occurring, similarly as in the case of FIG. 21.

As described, according to this embodiment, the electric field induced in and propagated through the electric field propagating medium is coupled to the electro-optic element through the first electrode, the parallel beam is injected into this electro-optic element to make the reflection or the multiple reflections, and the parallel beam outputted from the electro-optic element is split into the P-polarization component and the S-polarization component, converted into the light intensity changes, and at least one of the P-polarization component and the S-polarization component is converted into the electric signals and outputted by the optical isolator, so that by applying this embodiment to the transceiver for the wearable computer, for example, it becomes possible to properly carry out the communications among the wearable computers, which do not require any cable lines, which are free from the cross-talking with the other radio systems, and which do not depend on the Earth ground.

In addition, the parallel beam is reflected or multiply reflected in the electro-optic element, so that it has a long optical path length for which it is influenced by the electric field, and therefore the large polarization change is caused to the laser light and the large signal can be obtained. Consequently, the sufficient sensitivity can be obtained even by the electro-optic element in a small size, so that it becomes possible to realize the electric field detecting optical device in a smaller size at low cost.

Also, according to this embodiment, the electric field induced in and propagated through the electric field propagating medium is coupled to the electro-optic element through the first electrode, the parallel beam is injected into and passed through this electro-optic element, and the parallel beam outputted from this electro-optic element is split into the P-polarization component and the S-polarization component, converted into the light intensity changes by the analyzer, and at least one of the P-polarization component and the S-polarization component is converted into the electric signals and outputted, so that by applying this embodiment to the transceiver for the wearable computer, for example, it becomes possible to properly carry out the communications among the wearable computers, which do not require any cable lines, which are free from the cross-talking with the other radio systems, and which do not depend on the Earth ground.

Also, according to this embodiment, the two non-opposing side faces of the electro-optic element are shaped obliquely with respect to the propagating direction of the laser light, so that it is possible to surely prevent the resonance due to the inverse piezo-electric effect of the electro-optic element, flatten the frequency characteristic, and prevent the communication error due to the waveform distortion from occurring.

Figure 26:
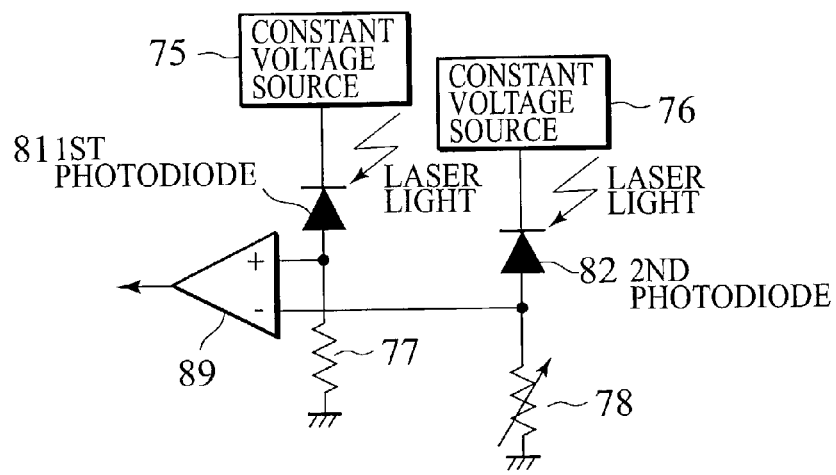
FIG. 26 is a circuit diagram showing a first exemplary configuration of a photodetection circuit to be used in an electric field detecting optical device of a transceiver according to the sixth embodiment of the present invention.
Figure 27:
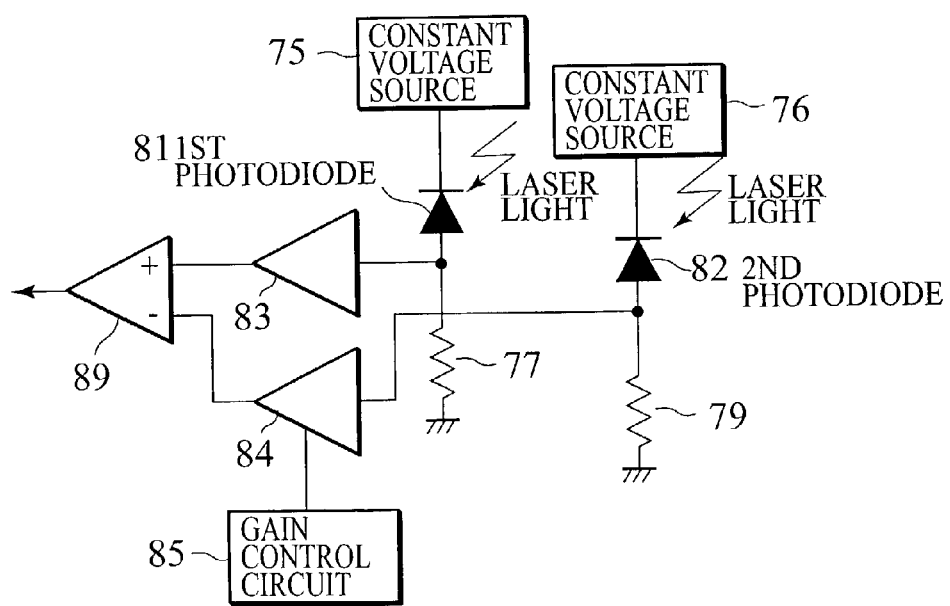
FIG. 27 is a circuit diagram showing a second exemplary configuration of a photodetection circuit to be used in an electric field detecting optical device of a transceiver according to the sixth embodiment of the present invention.
Figure 28:
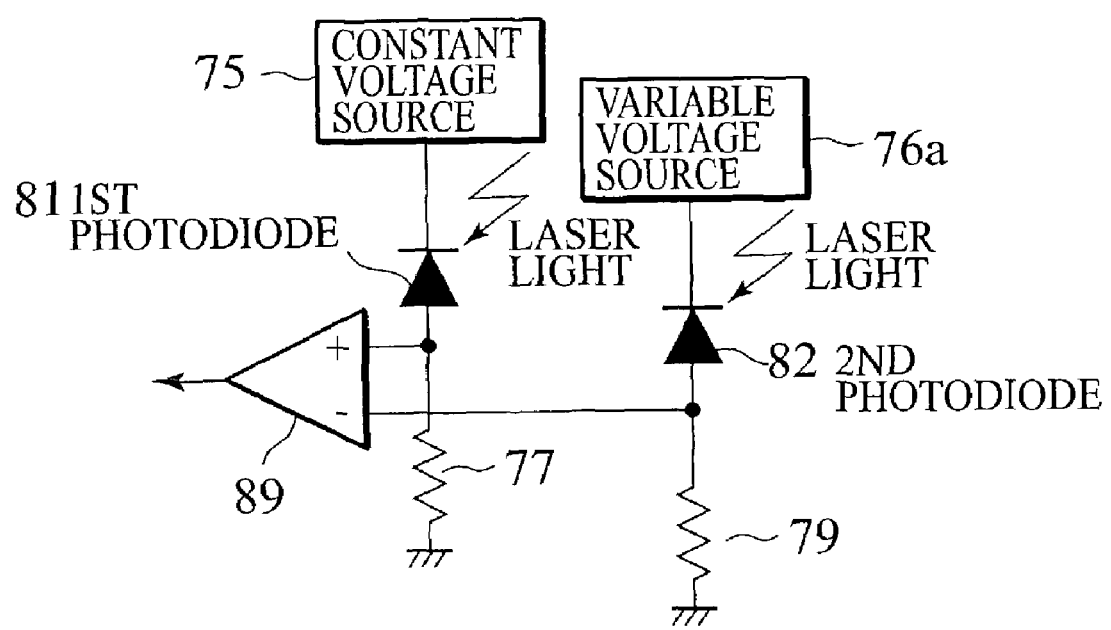
FIG. 28 is a circuit diagram showing a third exemplary configuration of a photodetection circuit to be used in an electric field detecting optical device of a transceiver according to the sixth embodiment of the present invention.

Referring now to FIG. 26 to FIG. 28, the sixth embodiment of the present invention related to the photodetection circuit will be described in detail.

FIG. 26 shows a first exemplary configuration of the photodetection circuit according to this embodiment.

The photodetection circuit of FIG. 26 is to be used as a unit for detecting the laser light that is split and outputted as the P-polarization component and the S-polarization component from the electric field detection optical unit 110 of the transceiver 3 that is used for the data communications among the wearable computers as described above, for example, and converting them into the electric signals. This photodetection circuit of FIG. 26 has first and second photodiodes 81 and 82 as the first and second photo-electric conversion units for detecting the laser light that is outputted by being split into the P-polarization component and the S-polarization component outputted from the electric field detecting optical unit and converting them into the electric signals.

The first and second photodiodes 81 and 82 have their cathodes connected to first and second constant voltage sources 75 and 76 respectively, and their anodes grounded through a fixed resistor 77 and a variable resistor 78 respectively to apply the inverse bias to the first and second photodiodes 81 and 82, such that when the lights are injected into the first and second photodiodes 81 and 82, the currents will be generated from the first and second photodiodes 81 and 82 and these currents will flow through the fixed resistor 77 and the variable resistor 78 to cause the voltage droppings.

Also, a contact point between the first photodiode 81 and the fixed resistor 77 and a contact point between the second photodiode 82 and the variable resistor 78 are connected to inputs of a differential amplifier 89, such that the voltages generated as a result of the voltage droppings caused at the fixed resistor 77 and the variable resistor 78 by the currents from the first and second photodiodes 81 and 82 will be entered into the differential amplifier 89 respectively.

In the photodetection circuit in the above described configuration, when the first and second photodiodes 81 and 82 detect the laser lights in the opposite phases in forms of the P-polarization component and the S-polarization component from the electric field detecting optical unit respectively, the currents according to the intensity changes of the laser lights are generated, and these currents are flown through the fixed resistor 77 and the variable resistor 78 respectively to cause the voltage droppings. The voltages generated at the fixed resistor 77 and the variable resistor 78 are applied to a non-inverted input and an inverted input of the differential amplifier 89 respectively, to be differentially amplified by the differential amplifier 89.

In the differential amplification at the differential amplifier 89, the intensity changes of the laser lights entered into the first and second photodiodes 81 and 82 have opposite phases, so that they are doubled in correspondence to a difference between the opposite phases at the differential amplifier 89 to output the normal output signals. If noises are mixed into the laser lights themselves, such noises will normally have the same phase and the same level, so that they will be cancelled and removed at the differential amplifier 89 and not be outputted from the differential amplifier 89.

However, as described above, the noises mixed into the output currents of the photodiodes through the metallic casings, for example, of the first and second photodiodes 81 and 82 are mixed at different noise levels in the first and second photodiodes 81 and 82 depending on the positional relationships or the like between the noise sources and the first and second photodiodes 81 and 82, so that they cannot be removed in their original forms even by the differential amplifier 89 and will be outputted as they are from the differential amplifier 89.

For this reason, in the exemplary configuration of FIG. 26, when the output currents of the first and second photodiodes 81 and 82 are deviated from the nominal current values that would have resulted without the influence of the noises because of the noises mixed from the metallic casings or the like of the photodiodes such that the resulting voltages generated by the fixed resistor 77 and the variable resistor 78 are also deviated from the nominal voltage values, the deviated voltages are reduced or cancelled by adjusting the resistance value of the variable resistor 78, such that the voltages generated at the fixed resistor 77 and the variable resistor 78 are corrected to the nominal voltage values without the influence of the noises and then entered into the differential amplifier 89, so as to remove the noises at different levels that are mixed from the metallic casings or the like of the first and second photodiodes 81 and 82, for example.

Next, FIG. 27 shows a second exemplary configuration of the photodetection circuit according to this embodiment.

The photodetection circuit of FIG. 27 differs from that of FIG. 26 in that the voltages to be entered into the differential amplifier 89 are adjusted by using a variable gain amplifier, instead of adjusting the voltages to be entered into the differential amplifier 89 by using the variable resistor 78. In the configuration of FIG. 27, a fixed resistor 79 is used instead of the variable resistor 78 used in the configuration of FIG. 26, the voltage of the fixed resistor 77 is amplified by a fixed gain amplifier 83 and entered into the differential amplifier 89 while the voltage of the fixed resistor 79 is amplified by a variable gain amplifier 84 and entered into the differential amplifier 89, and the gain of this variable gain amplifier 84 is adjusted by a gain control circuit 85. The rest of the configuration and the operation are the same as those of FIG. 26.

Using this configuration, when the noises at different levels are mixed from the metallic casings or the like of the first and second photodiodes 81 and 82 into the output currents of the photodiodes such that the resulting voltages generated at the fixed resistors 77 and 79 are deviated from the nominal voltage values as described above, the deviated voltages are reduced or cancelled by adjusting the gain of the variable gain amplifier 84, such that the voltages entered into the differential amplifier 89 are corrected to the nominal voltage values without the influence of the noises, so as to remove the noises at different levels that are mixed from the metallic casings or the like of the first and second photodiodes 81 and 82, for example.

In the overall operation, when the first and second photodiodes 81 and 82 detect the laser lights in the opposite phases in forms of the P-polarization component and the S-polarization component from the electric field detecting optical unit respectively, the currents according to the intensity changes of these laser lights are generated, and these currents are flown through the fixed resistors 77 and 79 respectively to cause the voltage droppings. Among the voltages generated at the fixed resistors 77 and 79, the voltage of the fixed resistor 77 is amplified by the fixed gain amplifier 83 and entered into the differential amplifier 89, and the voltage of the fixed resistor 79 is amplified by the variable gain amplifier 84 and entered into the differential amplifier 89. Here, the laser lights have opposite phases, so that they are doubled and outputted from the differential amplifier 89, while the noises mixed into the laser lights have the same phase and the same level so that they will be cancelled and removed at the differential amplifier 89.

Also, when the noises at different levels are mixed from the metallic casings or the like of the photodiodes 81 and 82 into the output currents of the photodiodes such that the voltages generated by the fixed resistors 77 and 79 are deviated from the nominal voltage values due to the influence of the noises, the voltages due to the noises are removed or cancelled by adjusting the gain of the variable gain amplifier 84 in correspondence to the deviated voltages at the gain control circuit 85, such that the voltages without the influence of the noises will be entered into the differential amplifier 89.

Next, FIG. 28 shows a third exemplary configuration of the photodetection circuit according to this embodiment.

The photodetection circuit of FIG. 28 differs from that of FIG. 26 in that the fixed resistor 79 is used instead of the variable resistor 78 used in the configuration of FIG. 26 and a variable voltage source 76a is used instead of the second constant voltage source 76 used in the configuration of FIG. 26, and the conversion efficiency of the photodiode is changed by varying the voltage of this variable voltage source 76a so as to adjust the voltage generated at the fixed resistor 79 as a result. The rest of the configuration and the operation are the same as those of FIG. 26.

Namely, as described with reference to FIG. 26, when the noises at different levels are mixed from the metallic casings or the like of the first and second photodiodes 81 and 82 into the output currents of the photodiodes such that the resulting voltages generated at the fixed resistors 77 and 79 are deviated from the nominal voltage values, the deviated voltages are reduced or cancelled by adjusting the voltage of the variable voltage source 76a, such that the voltages entered into the differential amplifier 89 are corrected to the nominal voltage values without the influence of the noises, so as to remove the noises at different levels that are mixed from the metallic casings or the like of the first and second photodiodes 81 and 82, for example.

Note that the above described exemplary configurations are directed to the cases of providing the variable resistor 78, the variable gain amplifier 84 and the gain control circuit 85, or the variable voltage source 76a on the second photodiode 82 side among the first and second photodiodes 81 and 82, but this embodiment is not necessarily limited to these cases, and it is also possible to provide them on the first photodiode 81 side or on both sides. In principle, it suffices to provide them at least on either one side.

As described, according to this embodiment, the electric signals obtained by the photo-electric conversion at the first and second photo-electric conversion units are converted into voltage signals and entered into a differential amplifier, and the voltage signals corresponding to the normal input lights are doubled and normally outputted from the differential amplifier, while the voltages corresponding to the noises of the same phase and the same level that are mixed into the input lights are removed by the differential amplifier, and the noises at different levels that are mixed into the current signals or the voltage signals can be surely removed by adjusting the adjustment unit such as a variable resistor, a variable gain amplifier or a variable voltage source as much as the voltages deviated from the nominal voltage values in correspondence to the noises.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A transceiver for inducing electric fields based on data to be transmitted in an electric field propagating medium and carrying out transmission and reception of data by using induced electric fields, comprising:
   a transmission electrode configured to induce the electric fields based on the data to be transmitted in the electric field propagating medium;
   a transmission circuit configured to supply transmission data for causing the transmission electrode to induce the electric fields based on the data to be transmitted in the electric field propagating medium, to the transmission electrode;
   a transmission side switch configured to disconnect the transmission circuit from the transmission electrode, when the transceiver is not in a transmission state in which the transmission circuit is supplying the transmission data to the transmission electrode;
   a reception electrode configured to receive electric fields induced in and propagated through the electric field propagating medium;
   an electric field detection unit configured to detect received electric fields as received by the reception electrode, and convert the received electric fields into electric signals;
   a signal processing unit configured to process the electric signals from the electric field detection unit and output processed electric signals;
   a reception side switch configured to disconnect the electric field detection unit from the signal processing unit or disconnect the signal processing unit from a circuit arranged subsequent to the signal processing unit, when the transceiver is in the transmission state; and
   a signal output unit configured to detect a start time of data packets generated as the transmission data, and output a first level signal during a prescribed period of time since the start time of the data packets and a second level signal during times other than the prescribed period of time;
   wherein the reception side switch is an analog switch by which a signal path between the electric field detection unit and the signal processing unit or between the signal processing unit and the circuit arranged subsequent to the signal processing unit is turned OFF while the first level signal is outputted from the signal output unit, and turned ON while the second level signal is outputted from the signal output unit.

2. A transceiver for inducing electric fields based on data to be transmitted in an electric field propagating medium and carrying out transmission and reception of data by using induced electric fields, comprising:
   a transmission electrode configured to induce the electric fields based on the data to be transmitted in the electric field propagating medium;
   a transmission circuit configured to supply transmission data for causing the transmission electrode to induce the electric fields based on the data to be transmitted in the electric field propagating medium, to the transmission electrode;

a transmission side switch configured to disconnect the transmission circuit from the transmission electrode, when the transceiver is not in a transmission state in which the transmission circuit is supplying the transmission data to the transmission electrode;

a reception electrode configured to receive electric fields induced in and propagated though the electric field propagating medium;

an electric field detection unit configured to detect received electric fields as received by the reception electrode, and convert the received electric fields into electric signals;

a signal processing unit configured to process the electric signals from the electric field detection unit and output processed electric signals;

a reception side switch configured to disconnect the electric field detection unit from the signal processing unit or disconnect the signal processing unit from a circuit arranged subsequent to the signal processing unit, when the transceiver is in the transmission state;

a signal output unit configured to detect a start time of data packets generated as the transmission data, and output a first level signal during a prescribed period of time since the start time of the data packets and a second level signal during times other than the prescribed period of time; and an electric field detection power control unit configured to stop power supply to the electric field detection unit so as to stop an operation of the electric field detection unit operable while the first level signal is outputted from the signal output unit, and supply power to the electric field detection unit so as to make the electric field detection unit operable while the second level signal is outputted from the signal output unit.

3. The transceiver of claim 1, wherein the transmission side switch is an analog switch by which a signal path between the transmission circuit and the transmission electrode is turned ON while the first level signal is outputted from the signal output unit, and turned OFF while the second level signal is outputted from the signal output unit.

4. The transceiver of claim 3, further comprising a transmission power control unit configured to supply power to the transmission circuit so as to make the transmission circuit operable while the first level signal is outputted from the signal output unit, and stop power supply to the transmission circuit so as to stop an operation of the transmission circuit while the second level signal is outputted from the signal output unit.

5. The transceiver of claim 2, wherein the transmission side switch is an analog switch by which a signal path between the transmission circuit and the transmission electrode is turned ON while the first level signal is outputted from the signal output unit, and turned OFF while the second level signal is outputted from the signal output unit.

6. The transceiver of claim 5, further comprising a transmission power control unit configured to supply power to the transmission circuit so as to make the transmission circuit operable while the first level signal is outputted from the signal output unit, and stop power supply to the transmission circuit so as to stop an operation of the transmission circuit while the second level signal is outputted from the signal output unit.

* * * * *